US008340319B2

(12) United States Patent
Kinouchi et al.

(10) Patent No.: US 8,340,319 B2
(45) Date of Patent: Dec. 25, 2012

(54) PLAYBACK DEVICE, PLAYBACK METHOD AND PLAYBACK SYSTEM

(75) Inventors: Takashi Kinouchi, Tokyo (JP); Kiminobu Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 940 days.

(21) Appl. No.: 12/275,763

(22) Filed: Nov. 21, 2008

(65) Prior Publication Data

US 2009/0147969 A1 Jun. 11, 2009

(30) Foreign Application Priority Data

Dec. 11, 2007 (JP) ................................ 2007-319411

(51) Int. Cl.
*H04B 15/00* (2006.01)

(52) U.S. Cl. ..................... 381/94.1; 381/94.5; 381/94.7; 381/122

(58) Field of Classification Search ................. 381/94.1, 381/94.5, 94.7, 122
See application file for complete search history.

(56) References Cited

U.S. PATENT DOCUMENTS

| | | | | |
|---|---|---|---|---|
| 7,961,895 | B2 * | 6/2011 | Wu et al. | 381/81 |
| 2006/0153394 | A1 * | 7/2006 | Beasley | 381/57 |
| 2006/0263064 | A1 * | 11/2006 | Tong et al. | 386/96 |

FOREIGN PATENT DOCUMENTS

| | | | |
|---|---|---|---|
| JP | 2000-59876 | A | 2/2000 |
| JP | 2004-526375 | A | 8/2004 |
| JP | 2006-217116 | A | 8/2006 |

* cited by examiner

*Primary Examiner* — Wai Sing Louie
(74) *Attorney, Agent, or Firm* — Oblon, Spivak, McClelland, Maier & Neustadt, L.L.P.

(57) ABSTRACT

A playback device includes: a playback portion that plays back content and outputs at least an audio signal; an acquisition portion that acquires an external audio signal; a generating portion that, based on noise collected by a sound collecting device, generates a noise cancellation signal to reduce the noise; a switching portion that, if the acquisition portion has acquired the external audio signal when the playback portion is playing back content, switches an output signal from the audio signal to the external audio signal; and a synthesizing portion that synthesizes the output signal from the switching portion with the noise cancellation signal.

8 Claims, 33 Drawing Sheets

PLAYBACK DEVICE, PLAYBACK METHOD AND PLAYBACK SYSTEM

CROSS REFERENCES TO RELATED APPLICATIONS

The present invention contains subject matter related to Japanese Patent Application JP 2007-319411 filed in the Japan Patent Office on Dec. 11, 2007, the entire contents of which being incorporated herein by reference.

BACKGROUND OF THE INVENTION

1. Field of the Invention

The present invention relates to a playback device, a playback method and a playback system.

2. Description of the Related Art

Devices that can play back various sounds (hereinafter also referred to as "playback devices") such as, for example, a mobile music player, a voice recorder, a personal digital assistant (PDA), a laptop personal computer and a mobile telephone, are widely used. These playback devices have various functions that are used when playing back sound such as music. A noise cancellation function is known as one of these functions. The noise cancellation function is a function that, when playing back music or video in a place where ambient noise is loud, generates sound having a reverse phase to that of the ambient noise to remove or reduce the ambient noise.

The noise cancellation function has been provided in a headphone and the like as disclosed in, for example, Japanese Patent Application Publication No. JP-A-3-96199, Japanese Patent Application Publication No. JP-A-3-214892, and Japanese Patent Application Publication No. JP-A-2-231899. However, a noise cancellation headphone has a separate power source, a circuit or mechanism for cancelling noise. As a result, the structure of the noise cancellation headphone becomes large. To address this, a technology that incorporates the noise cancellation function in a playback device has been developed recently. The noise cancellation function can be used when enjoying music etc. played back by the playback device, and is well received by users.

SUMMARY OF THE INVENTION

However, the noise cancellation function provided in a known playback device has limited uses. The noise cancellation function can only be used when enjoying content (for example, music, video, radio etc.) in the playback device. Accordingly, when enjoying content other than the content in the playback device, such as when watching a movie on an airplane, or when a user only wants to remove ambient noise, the noise cancellation function cannot be used.

The present invention addresses the issues described above and provides a playback device, a playback method, and a playback system that are new and improved and that make it possible to reduce ambient noise, even for audio input from an external source.

According to an embodiment of the present invention that addresses the issues described above, there is provided a playback device that includes: a playback portion that plays back content and outputs at least an audio signal; an acquisition portion that acquires an external audio signal; a generating portion that, based on noise collected by a sound collecting device, generates a noise cancellation signal to reduce the noise; a switching portion that, if the acquisition portion has acquired the external audio signal when the playback portion is playing back content, switches an output signal from the audio signal to the external audio signal; and a synthesizing portion that synthesizes the output signal from the switching portion with the noise cancellation signal.

With this configuration, the switching portion can switch the signal that is used when the signal synthesizing portion synthesizes the noise cancellation signal, from the audio signal to the external audio signal.

Further, if the acquisition portion has acquired the external audio signal, the generating portion may switch a property to generate the noise cancellation signal from one property to another property.

With this configuration, when the synthesizing portion synthesizes the noise cancellation signal with the audio signal output from the playback portion, the generating portion generates the noise cancellation signal using one property. On the other hand, when the synthesizing portion synthesizes the noise cancellation signal with the external audio signal, the generating portion generates the noise cancellation signal using another property.

Furthermore, when the acquisition portion has acquired the external audio signal, the playback portion may stop playback of the content.

Moreover, when the playback portion resumes playback from a stopped state, the playback portion may resume playback of the content from a stopped position.

With this configuration, playback can be automatically stopped or resumed in accordance with an acquisition state of the external audio signal.

Further, when the playback portion has not yet played back the content and the acquisition portion has not acquired the external audio signal, the generating portion may output the noise cancellation signal to the outside.

With this configuration, the playback device also makes it possible to provide only the noise cancellation signal to the user.

Furthermore, when the noise includes predetermined information, the generating portion may stop generation of the noise cancellation signal.

With this configuration, the sound including predetermined information, such as information that may be necessary for the user, can be inhibited from being reduced by the noise cancellation signal.

Moreover, when the playback portion has stopped playback of the content, the generating portion may stop generation of the noise cancellation signal.

With this configuration, when the playback portion has stopped playback of the content, it is possible to inhibit the reduction of the noise by the noise cancellation signal. Thus, the user can hear the noise.

According to another embodiment of the present invention that addresses the issues described above, there is provided a playback method that includes the steps of: playing back content and outputting at least an audio signal; acquiring an external audio signal; generating a noise cancellation signal to reduce noise collected by a sound collecting device; switching, if the external audio signal is acquired when the content is being played back, an output signal from the audio signal to the external audio signal; and synthesizing the output signal with the noise cancellation signal.

According to another embodiment of the present invention that addresses the issues described above, there is provided a playback system that includes: an audio output device that includes a sound collecting device that collects ambient sound; and a playback device. The playback device includes a playback portion that plays back content and outputs at least an audio signal, an acquisition portion that acquires an external audio signal, a generating portion that generates a noise cancellation signal to reduce noise collected by the sound collecting device, a switching portion that, if the acquisition portion has acquired the external audio signal when the playback portion is playing back the content, switches an output signal from the audio signal to the external audio signal, and a synthesizing portion that synthesizes the output signal from the switching portion with the noise cancellation signal.

According to the embodiments of the present invention described above, ambient noise can be reduced even for audio output from outside.

DETAILED DESCRIPTION OF THE PREFERRED EMBODIMENTS

Figure 1:
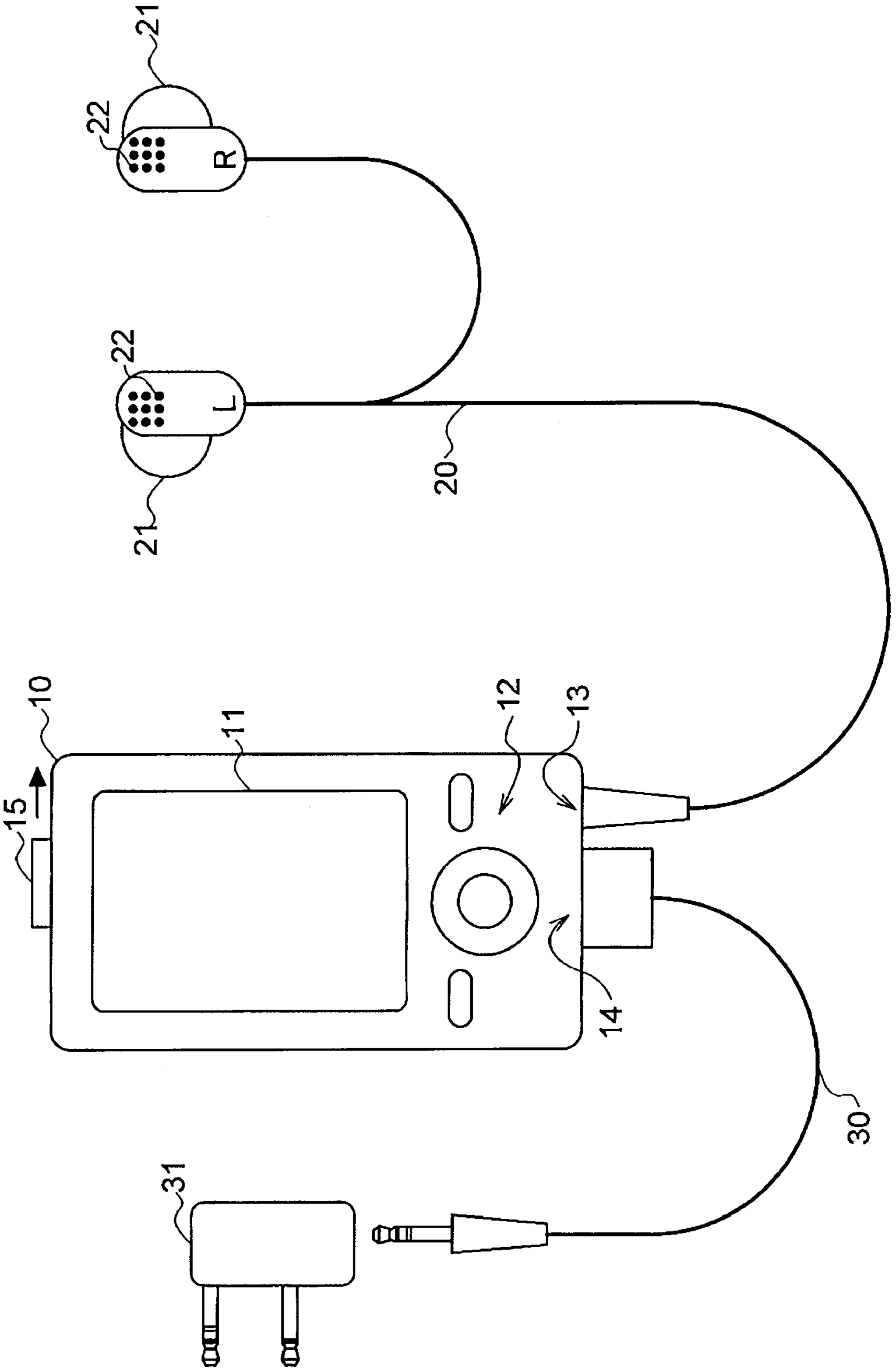
FIG. 1 is an explanatory figure that illustrates an external configuration and the like of a playback device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, with reference to FIG. 1, an external configuration and the like of a playback device according to a first embodiment of the present invention will be described. FIG. 1 is an explanatory figure that illustrates the external configuration and the like of the playback device according to the first embodiment of the present invention.

Note that, in the present embodiment, a playback device that plays back content (for example, video, audio, etc.) recorded in advance in a recording portion will be described. However, the present invention is not limited to this example. The present invention can also be applied to a playback device (a player) that plays back audio information recorded in advance in a removable storage medium when the removable storage medium is inserted into the playback device. Examples of the removable storage medium include an optical disc, such as a compact disc (CD), a magneto optical (MO) disc or a digital versatile disc (DVD), a magnetic disc, and a semiconductor memory.

External Configuration and the Like of the Playback Device

As shown in FIG. 1, a playback device 10 according to the present embodiment includes a display portion 11, an operation portion 12, an earphone connection portion 13, an external connection portion 14, and an NC switch 15.

The display portion 11 and the operation portion 12 are preferably provided on a surface of the playback device 10 so that a user can visually confirm the display portion 11 and operate the operation portion 12. The display portion 11 displays predetermined information, and provides, for example, the video of the played back content, a still image, and the predetermined information to the user. The operation portion 12 outputs a predetermined operation signal in response to an operation by the user. Note that, the operation portion 12 may be formed integrally with the display portion 11, like a touch panel. Alternatively, the operation portion 12 may be an external device such as a remote controller that outputs a predetermined signal from outside the playback device 10 by wireless communication.

The earphone connection portion 13 is a connection terminal connected to an earphone 20 that is one example of a sound output device. The earphone 20 includes, for example, audio output portions 21 and sound collecting microphones 22. The audio output portions 21 include a speaker unit and a driver etc. The sound collecting microphones 22 collect ambient sound and convert it to an electric signal (a collected sound signal).

In other words, the playback device 10 outputs a sound signal that causes the audio output portions 21 to be driven to the audio output portions 21 via the earphone connection portion 13. Thus, the user listens to actual sound (audio) emitted by the driving of the audio output portions 21 in response to the sound signal. The sound collecting microphones 22 are one example of a sound collecting device, and output a collected sound signal converted from the collected ambient sound. The playback device 10 acquires the collected sound signal via the earphone connection portion 13. The collected sound signal is used when noise cancellation (noise reduction) is performed in the playback device 10, which will be described later.

Here, a case is described where the sound output device connected to the earphone connection portion 13 is the earphone 20. However, the sound output device may be a headphone, a headset, a speaker, or the like. Further, the sound collecting microphones 22 do not necessarily have to be formed integrally with the earphone 20 (a headphone or the like, when the sound output device is the headphone or the like), and may be separate sound collecting microphones or sound collecting microphones provided in the playback device 10. Moreover, here, the sound collecting microphones 22 are arranged to collect sound outside the spaces formed by the inside of the ears and the earphone 20. That is, the noise cancellation (hereinafter also referred to as NC) function is a feed forward NC function. However, the sound collecting microphones 22 may be arranged to collect sound inside the spaces formed by the inside of the ears and the earphone 20, and the NC function of the playback device 10 may be a feed back NC function.

The external connection portion 14 is a connection terminal that is connectable to an external device. An external audio signal (hereinafter also referred to as an "external signal") output from an external device is input to the external connection portion 14 via an external connection cord 30. Note that, when an in-flight broadcast, an in-flight movie, an in-flight announcement or the like is input, a terminal transducer 31 or the like is connected to the external connection cord 30 so as to be connectable with a connection terminal provided in the airplane. In this case, an external signal is input to the external connection portion 14 via the terminal transducer 31 and the external connection cord 30.

Here, a case is described in which the earphone connection portion 13 and the external connection portion 14 are wired connection terminals. However, the earphone connection portion 13 and the external connection portion 14 may perform wireless communication.

Figure 2A:
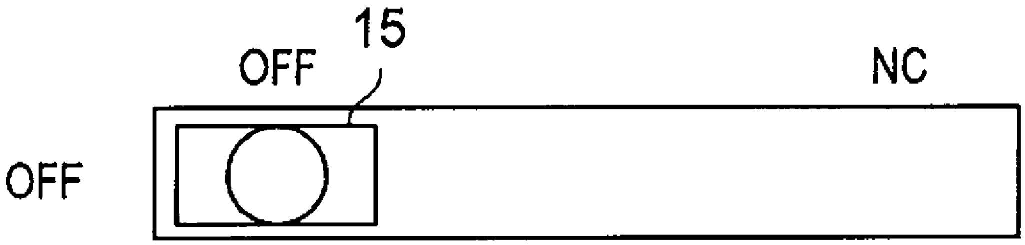
FIG. 2A is an explanatory figure that illustrates mode switching by an NC switch 15.
Figure 2B:
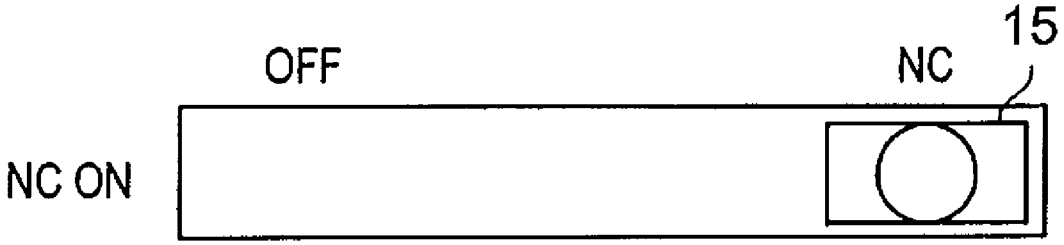
FIG. 2B is an explanatory figure that illustrates mode switching by the NC switch 15.

The NC switch 15 is one example of a switching portion that switches operation/non-operation of the NC function. When the user slides the NC switch 15, the operation/non-operation of the NC function is switched. FIG. 2A and FIG. 2B show mode switching states. FIG. 2A and FIG. 2B are explanatory figures that illustrate mode switching by the NC switch 15.

FIG. 2A shows a case when the NC switch 15 is placed in an "OFF" position. In this case, the NC function is OFF (not operated or deactivated). When the user slides the switch 15 in the left to right direction, this state shifts to the state shown in FIG. 2B. FIG. 2B shows a case when the NC switch 15 is placed in an "NC" position. In this case, the NC function is ON (operated or activated).

Figure 3:
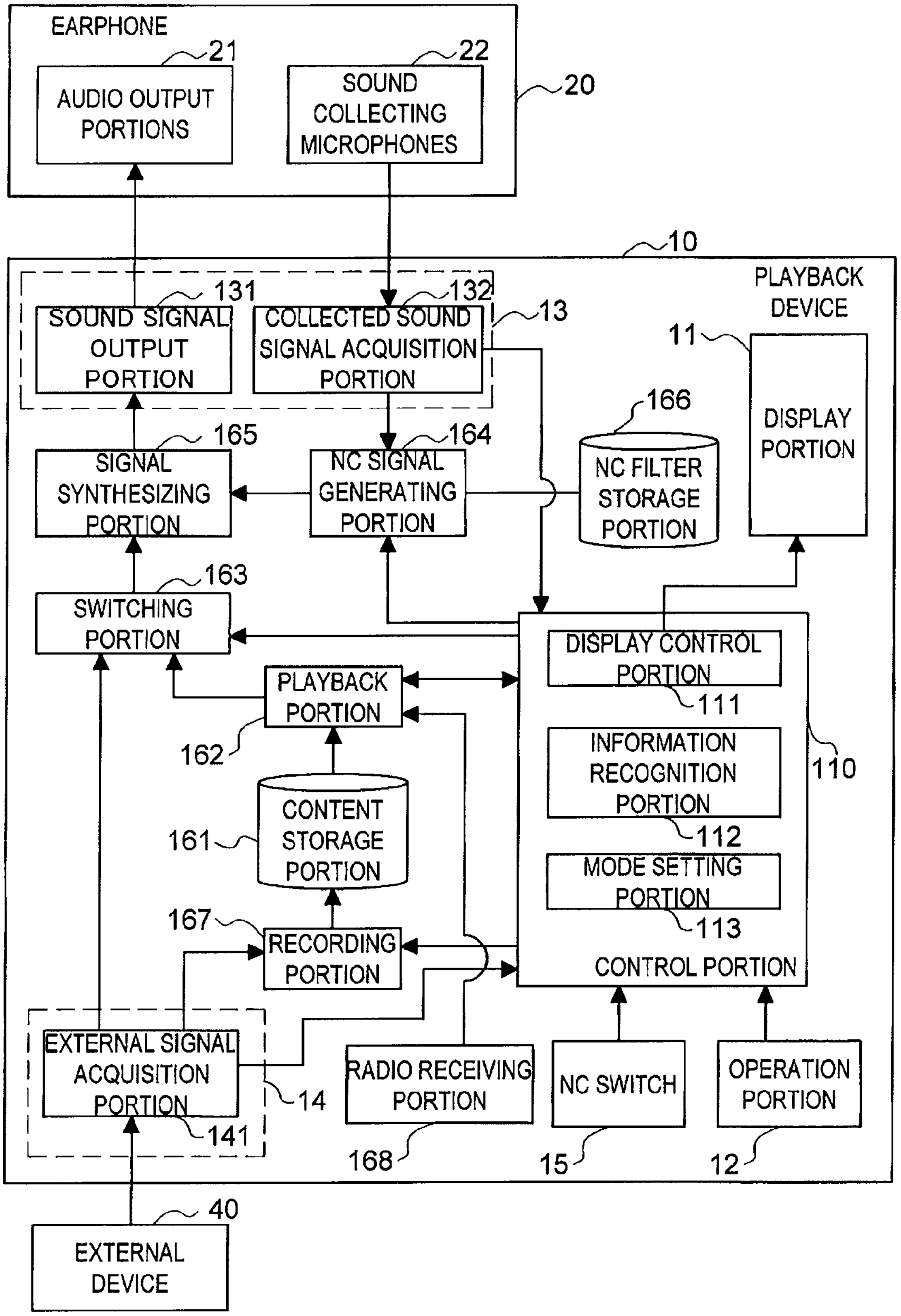
FIG. 3 is an explanatory figure that illustrates an internal configuration and the like of the playback device according to the first embodiment.

Next, with reference to FIG. 3, an internal configuration and the like of the playback device 10 according to the present embodiment will be described. FIG. 3 is an explanatory figure that illustrates the internal configuration and the like of the playback device 10 according to the present embodiment.

Internal Configuration and the Like of the Playback Device

As shown in FIG. 3, the playback device 10 according to the present embodiment includes, as described above, the display portion 11, the operation portion 12, the earphone connection portion 13, the external connection portion 14, and the NC switch 15. The earphone connection portion 13 includes a sound signal output portion 131 and a collected sound signal acquisition portion 132. The external connection portion 14 includes an external signal acquisition portion 141. An external signal may be a digital signal or an analog signal.

The sound signal output portion 131 outputs a sound signal to the audio output portions 21 of the earphone 20. The collected sound signal acquisition portion 132 acquires, from the sound collecting microphones 22 of the earphone 20, a collected sound signal converted from the sound collected by the sound collecting microphones 22. The external signal acquisition portion 141 is one example of an acquisition portion, and acquires, from an external device 40 via the external connection cord 30 or the like, an external audio signal output by the external device 40. Further, the external signal acquisition portion 141 outputs a signal indicating whether or not the external device 40 is connected.

The playback device 10 according to the present embodiment further includes a content storage portion 161, a playback portion 162, a switching portion 163, an NC signal generating portion 164, a signal synthesizing portion 165, an NC filter storage portion 166, a recording portion 167, a radio receiving portion 168, and a control portion 110.

One or a plurality of contents are stored in advance in the content storage portion 161. The playback portion 162 acquires content from the content storage portion 161 and plays back the content.

The switching portion 163 acquires an audio signal contained in the playback signal output by the playback portion 162 playing back the content. Note that, when the content is a video content that includes video, a video signal in the playback signal is displayed on the display portion 11 by a display control portion 111. The switching portion 163 further acquires the external signal acquired by the external signal acquisition portion 141. The switching portion 163 is controlled by the control portion 110 and outputs a signal. Note that, the playback device 10 has a plurality of operation modes (hereinafter also simply referred to as "modes") including a "normal mode", an "external input mode" and a "silent mode" that are used in accordance with an operation state of the NC function. The switching portion 163 switches an output signal in accordance with the mode. More specifically, when in the normal mode, the switching portion 163 outputs the audio signal output by the playback portion 162; when in the external input mode, the switching portion 163 outputs the external signal acquired by the external signal acquisition portion 141; and in the silent mode, the switching portion 163 outputs no signal. Note that, when in the external input mode and the silent mode, the playback portion 162 pauses playback of the content.

The NC signal generating portion 164 is one example of a generating portion, and acquires the collected sound signal acquired by the collected sound signal acquisition portion 132. The sound collected by the sound collecting microphones 22 includes noise emitted from an external noise source. Accordingly, the collected sound signal includes a noise signal. Given this, the NC signal generating portion 164 generates, from this noise signal, a noise cancellation signal (hereinafter also referred to as an "NC signal") to cancel or reduce noise. The NC signal generating portion 164 has a filter to generate a noise cancellation signal, and processes the noise signal using this filter, thereby generating the NC signal. Therefore, in the present embodiment, a noise cancellation property is determined by a filter type. Note that, for example, noise in an airplane includes engine sound, conversation of other passengers, and other sounds emitted from various objects that could be noise sources.

The noise cancellation property is one example of a property. Examples of the noise cancellation property include noise removal rate distribution with respect to a frequency band, time required for NC signal generation, and an NC signal generation method. Examples of the process using a filter include reversal of the phase of a noise signal. According to this process example, when the NC signal is output as sound, the output sound and noise interfere with each other and they are mutually weakened. Note that the noise cancellation property and the process using a filter described herein are only examples, and the present invention is not limited to these examples.

Moreover, a plurality of filters having different noise cancellation properties are recorded in advance in the NC filter storage portion 166. The NC signal generating portion 164 can switch a filter that is used when generating an NC signal. Note that, in the present embodiment, in accordance with a mode, the NC signal generating portion 164 uses a filter suitable for the mode. Hereinafter, a filter suitable for the normal mode is referred to as a "first filter", a filter suitable for the external input mode is referred to as a "second filter, and a filter suitable for the silent mode is referred to as a "third filter".

The signal synthesizing portion 165 is one example of a synthesizing portion. The signal synthesizing portion 165 acquires a signal output by the switching portion 163 and an NC signal generated by the NC signal generating portion 164. The signal synthesizing portion 165 synthesizes the NC signal acquired from the NC signal generating portion 164 with the signal acquired from the switching portion 163, thereby generating a sound signal. When the switching portion 163 does not output a signal, the signal synthesizing portion 165 outputs only the NC signal generated by the NC signal generating portion 164 as a sound signal. In other words, when the switching portion 163 does not output a signal, the NC signal generating portion 164 outputs the NC signal to the outside. On the other hand, when the NC signal generating portion 164 does not generate an NC signal, the signal synthesizing portion 165 outputs only the signal output by the switching portion 163 as a sound signal.

The recording portion 167 acquires an external signal acquired by the external signal acquisition portion 141 and a radio signal received by the radio receiving portion 168, and records the signals in the content storage portion 161 as new content. A recording operation of the recording portion 167 is started by the control portion 110.

The radio receiving portion 168 receives a radio signal. The received radio signal is acquired not only by the above-described recording portion 167 but also by the playback portion 162. Therefore, the playback portion 162 can play back the radio signal in addition to the content recorded in the content storage portion 161.

The control portion 110 performs entire control of the playback device 10 by controlling each structural element described above. Note that the control portion 110 acquires an ON/OFF signal indicating operation/non-operation of the NC function from the NC switch 15, and acquires various operation signals that are output from the operation portion 12 according to a user operation. Then, the control portion 110 controls each structural element described above based on, for example, the operation state of each structural element described above, the ON/OFF signal, and the operation signals. Further, the control portion 110 includes a control information storage portion (not shown in the figures), and it may perform control by obtaining predetermined control information recorded in the control information storage portion.

The control portion 110 mainly includes the display control portion 111, an information recognition portion 112, and a mode setting portion 113.

The display control portion 111 controls images and video displayed on the display portion 11. At this time, the display control portion 111 causes the display portion 11 to display predetermined images or video (for example, images or video recorded in the control information storage portion (not shown in the figures)).

The information recognition portion 112 recognizes whether or not predetermined information is included in the collected sound signal received by the collected sound signal acquisition portion 132. More specifically, the information recognition portion 112 determines whether or not the noise included in the collected sound signal includes information necessary for the user, by comparing the collected sound signal with a predetermined audio pattern (for example, a predetermined audio pattern recorded in the control information storage portion (not shown in the figures)). Examples of this necessary information include a siren of an emergency vehicle, a car horn sound, an in-flight announcement and the like. However, the present invention is not limited to these examples. When the information recognition portion 112 detects the aforementioned sound, it can temporarily turn OFF the NC signal generating portion 164. Thus, the NC function does not cancel noise, and the user can hear the sound including the necessary information.

The mode setting portion 113 sets one of the normal mode, the external input mode, and the silent mode. The switching of the mode setting by the mode setting portion 113 is basically performed in response to the ON/OFF signal or the operation signal according to a user operation. However, as described later, the mode setting portion 113 sets the mode by automatically switching the mode in response to an operation of each structural element or the like.

An example of an automatic mode switching by the mode setting portion 113 will be described. For example, when the playback portion 162 is playing back content, the normal mode is set. If during the playback, the external signal acquisition portion 141 has acquired an external signal, the mode setting portion 113 switches the mode to the external input mode. Then, as described above, the playback portion 162 is stopped. A more detailed explanation of the automatic mode switching will be described in conjunction with the operation of the playback device 10.

The configuration of the playback device 10 according to the present invention is described above.

Next, with reference FIG. 4 to FIG. 15, an operation of the playback device 10 according to the present embodiment will be described.

FIG. 4 to FIG. 7 are flowcharts that each illustrate the operation of the playback device according to the present embodiment. FIG. 8A to FIG. 15 are explanatory figures that each illustrate a display image displayed on the display portion by the operation of the playback device according to the present embodiment.

Operation of the Playback Device

Figure 4:
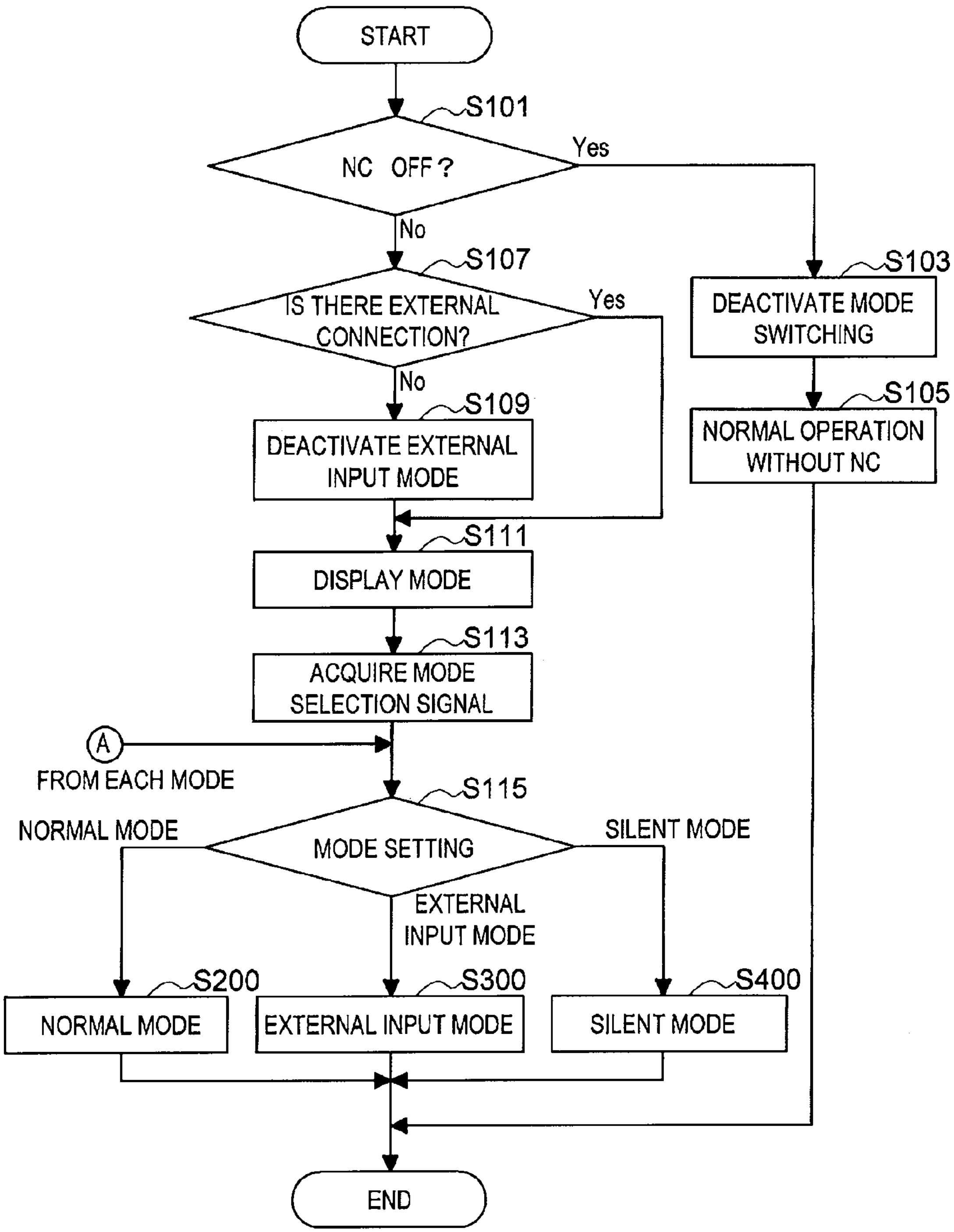
FIG. 4 is a flowchart that illustrates an operation of the playback device according to the first embodiment.

As shown in FIG. 4, at step S101, the control portion 110 of the playback device 10 first confirms the ON/OFF signal from the NC switch 15, in order to confirm whether or not the NC function is OFF. When the NC function is OFF, the process proceeds to step S103. When the NC function is not OFF, the process proceeds to step S107.

When the process proceeds to step S103, the mode switching performed by the mode setting portion 113 is deactivated (not operated) at step S103. Then, the process proceeds to step S104, and the playback device 10 performs normal operation without using the NC function. More specifically, in this case, the NC signal generating portion 164 does not generate an NC signal, and the signal synthesizing portion 165 outputs the signal output from the switching portion 163 as is to the earphone 20 via the sound signal output portion 131. After the normal operation is completed, the playback device 10 ends the operation.

On the other hand, when the process proceeds to step S107, the control portion 110 confirms at step S107 whether or not the external device 40 is connected to the external signal acquisition portion 141. When the external device 40 is not connected to the external signal acquisition portion 141, the process proceeds to step S109. When the external device 40 is connected to the external signal acquisition portion 141, the process proceeds to step S111.

When the process proceeds to step S109, the mode setting portion 113 deactivates the external input mode. Then, the process proceeds to step S111.

At step S111, the display control portion 111 displays a selectable mode on the display portion 11. More specifically, when step S109 is completed, the normal mode and the silent mode are displayed on the display portion 11. On the other hand, when the process proceeds from step S107 to step S111 without performing step S109, the normal mode, the external input mode, and the silent mode are displayed on the display portion 11.

After performing step S111, the process proceeds to step S113. At step S113, the mode setting portion 113 acquires a mode selection signal, which is one of the operation signals that are output from the operation portion 12 according to a user operation. Then, the process proceeds to step S115. At step S115, the mode setting portion 113 sets the operation mode of the playback device 10 to the mode indicated by the mode selection signal. When the set mode is the normal mode, the process proceeds to step S200. When the set mode is the external input mode, the process proceeds to step S300. When the set mode is the silent mode, the process proceeds to step S400. The processes at steps S200 to S400 will be described later.

After performing the processes at steps S200 to S400, the playback device 10 ends the operation.

The images displayed on the display portion 11 in the above-described series of operations, and the user operation will now be described.

Figure 8A:
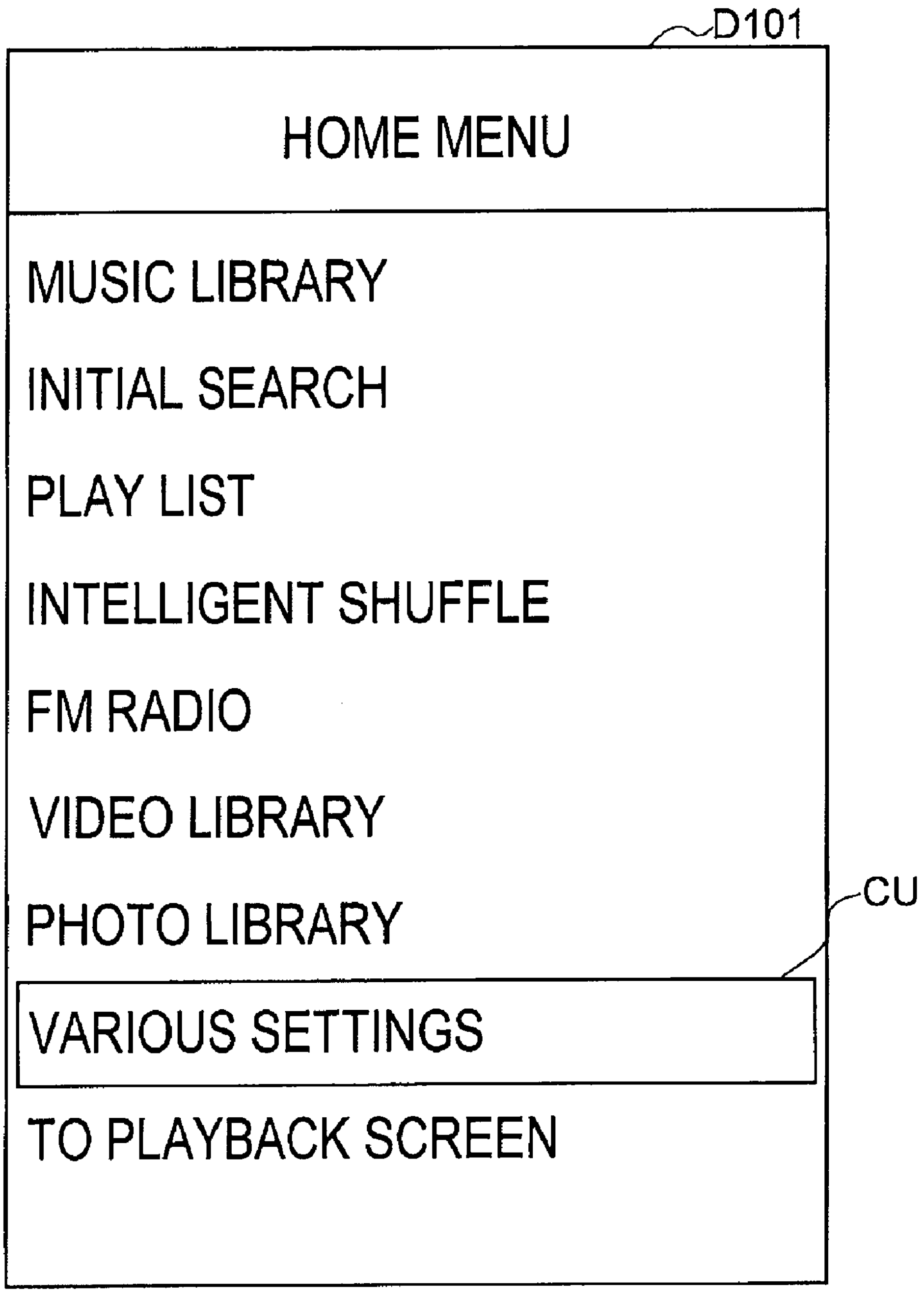
FIG. 8A is an explanatory figure that illustrates a display image displayed on a display portion by the operation of the playback device according to the first embodiment.

For example, an image D101 "home menu" shown in FIG. 8A is displayed on the display portion 11. A cursor CU is also displayed on the display portion 11. The cursor CU moves in response to an operation signal that is output from the operation portion 12 according to a user operation. An item at which the cursor CU is positioned is selected by the operation signal output from the operation portion 12 according to the user operation.

Figure 8B:
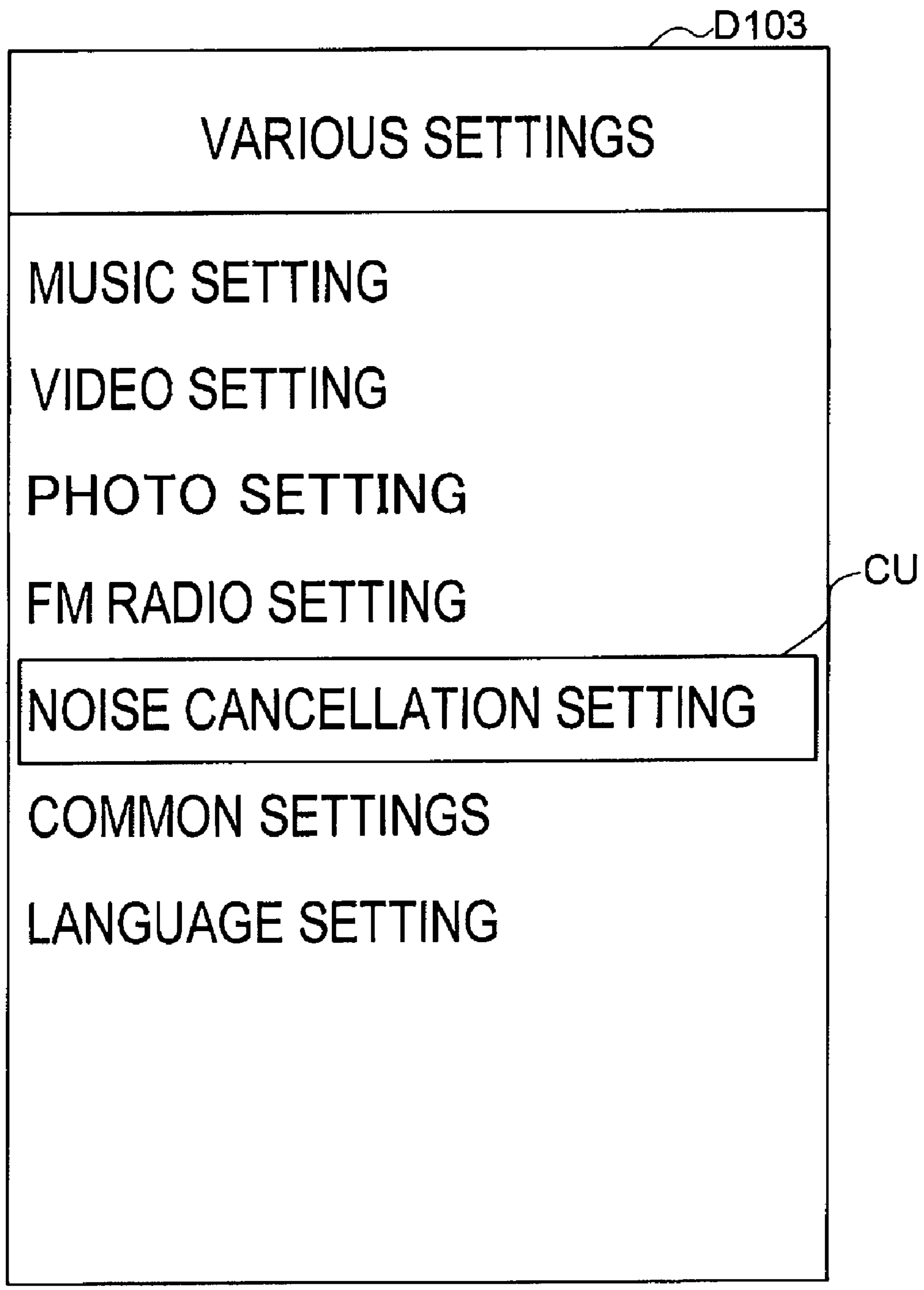
FIG. 8B is an explanatory figure that illustrates a display image displayed on the display portion by the operation of the playback device according to the first embodiment.
Figure 8C:
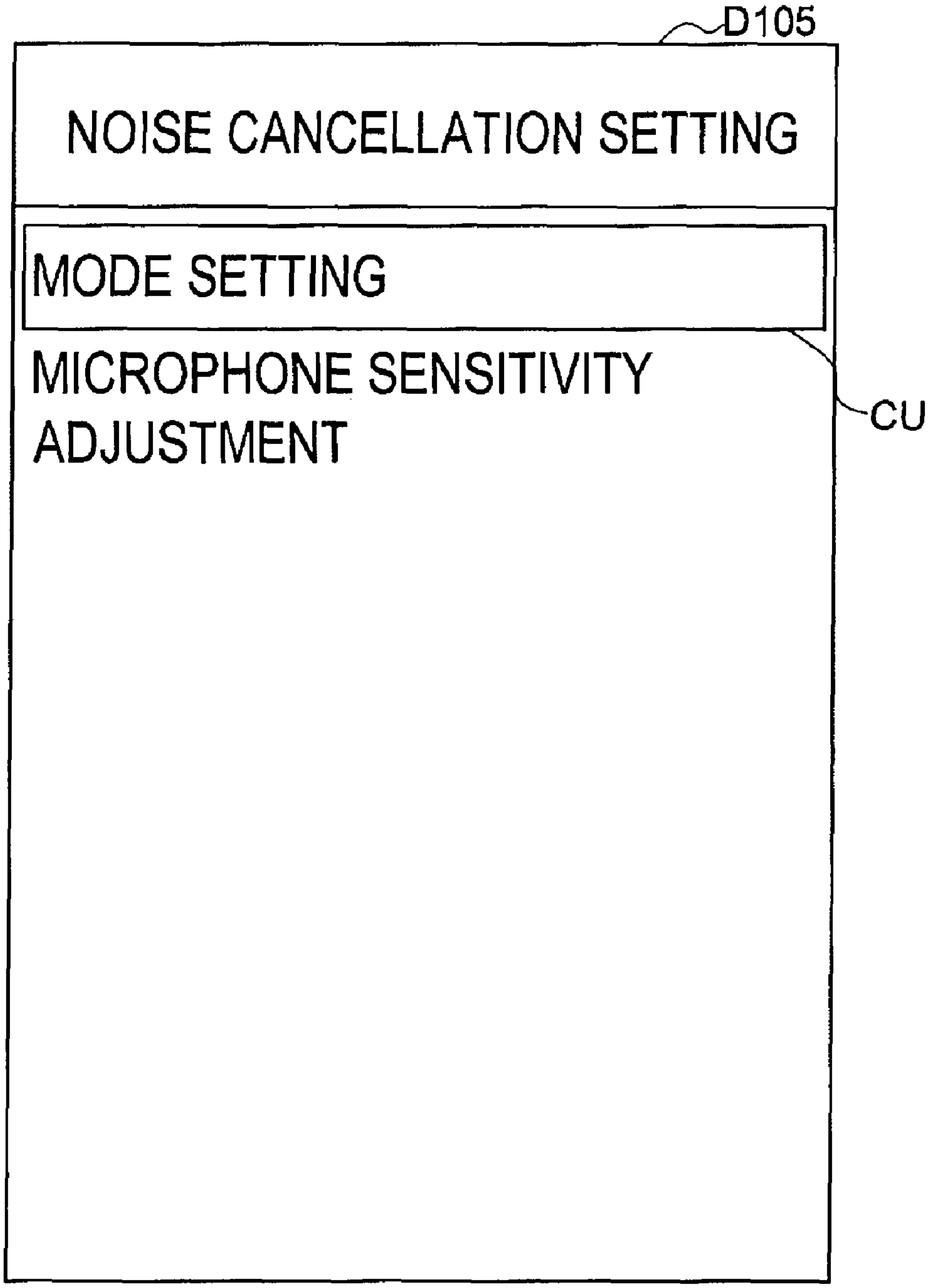
FIG. 8C is an explanatory figure that illustrates a display image displayed on the display portion by the operation of the playback device according to the first embodiment.
Figure 9A:
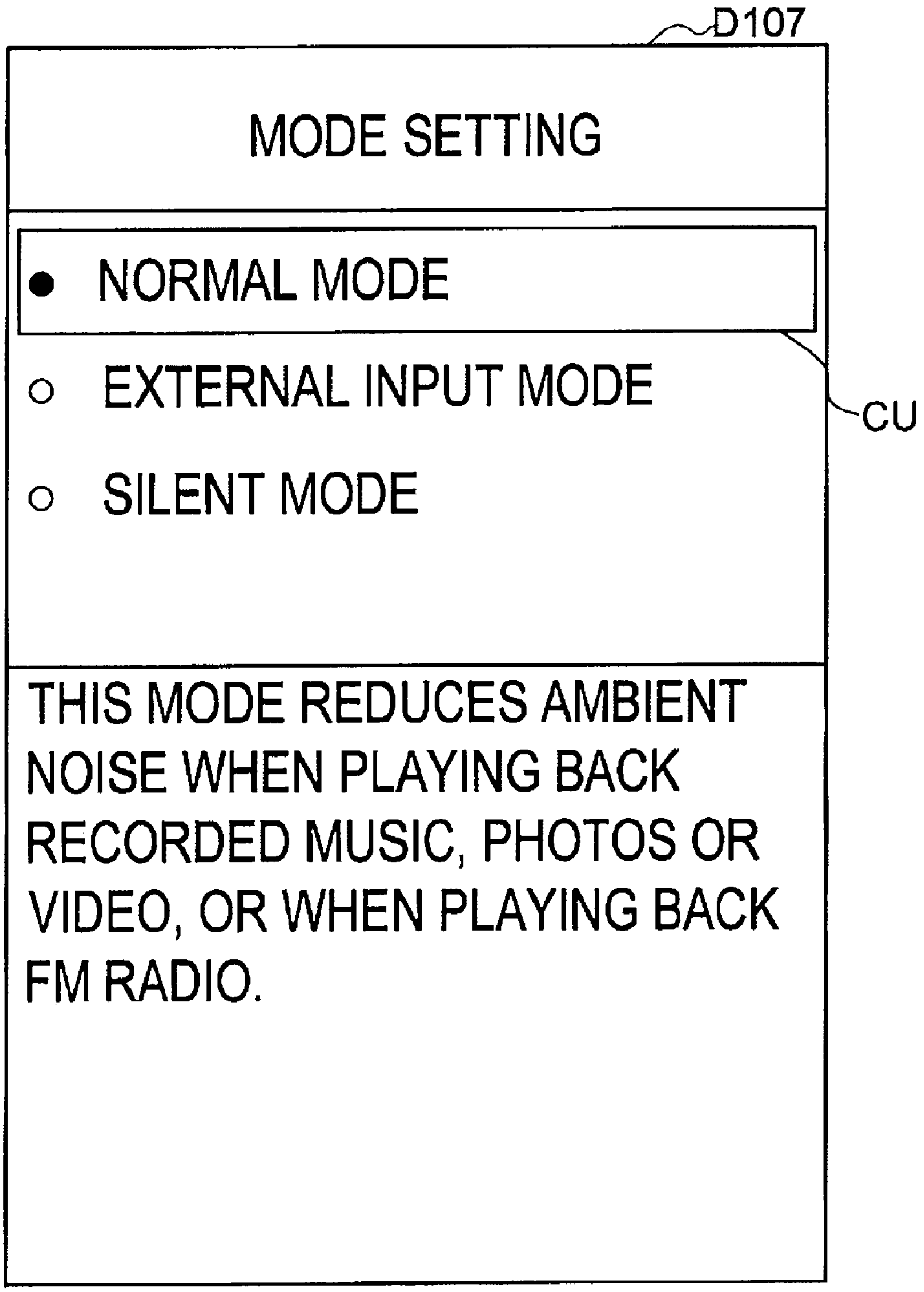
FIG. 9A is an explanatory figure that illustrates a display image displayed on the display portion by the operation of the playback device according to the first embodiment.
Figure 9B:
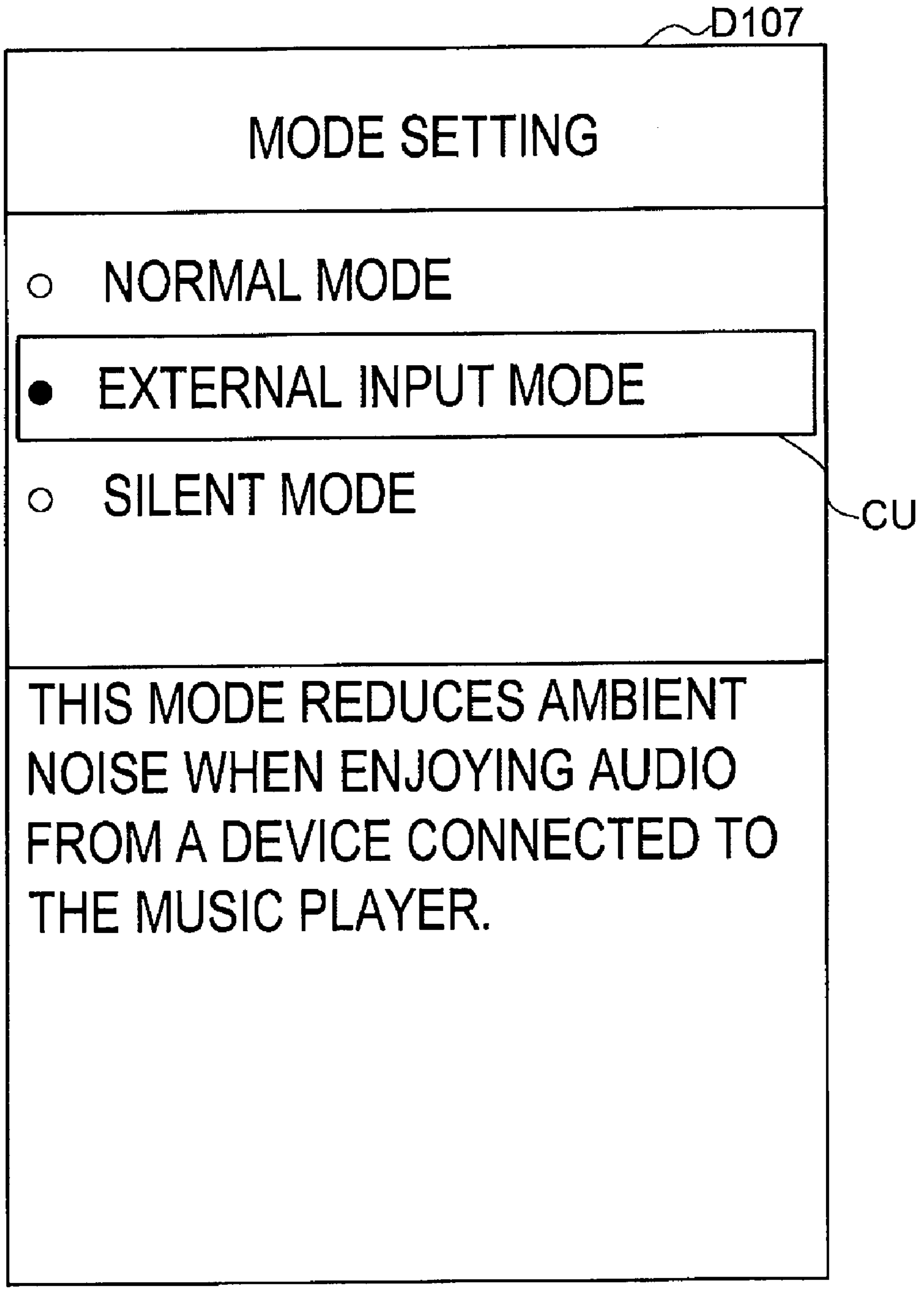
FIG. 9B is an explanatory figure that illustrates a display image displayed on the display portion by the operation of the playback device according to the first embodiment.
Figure 9C:
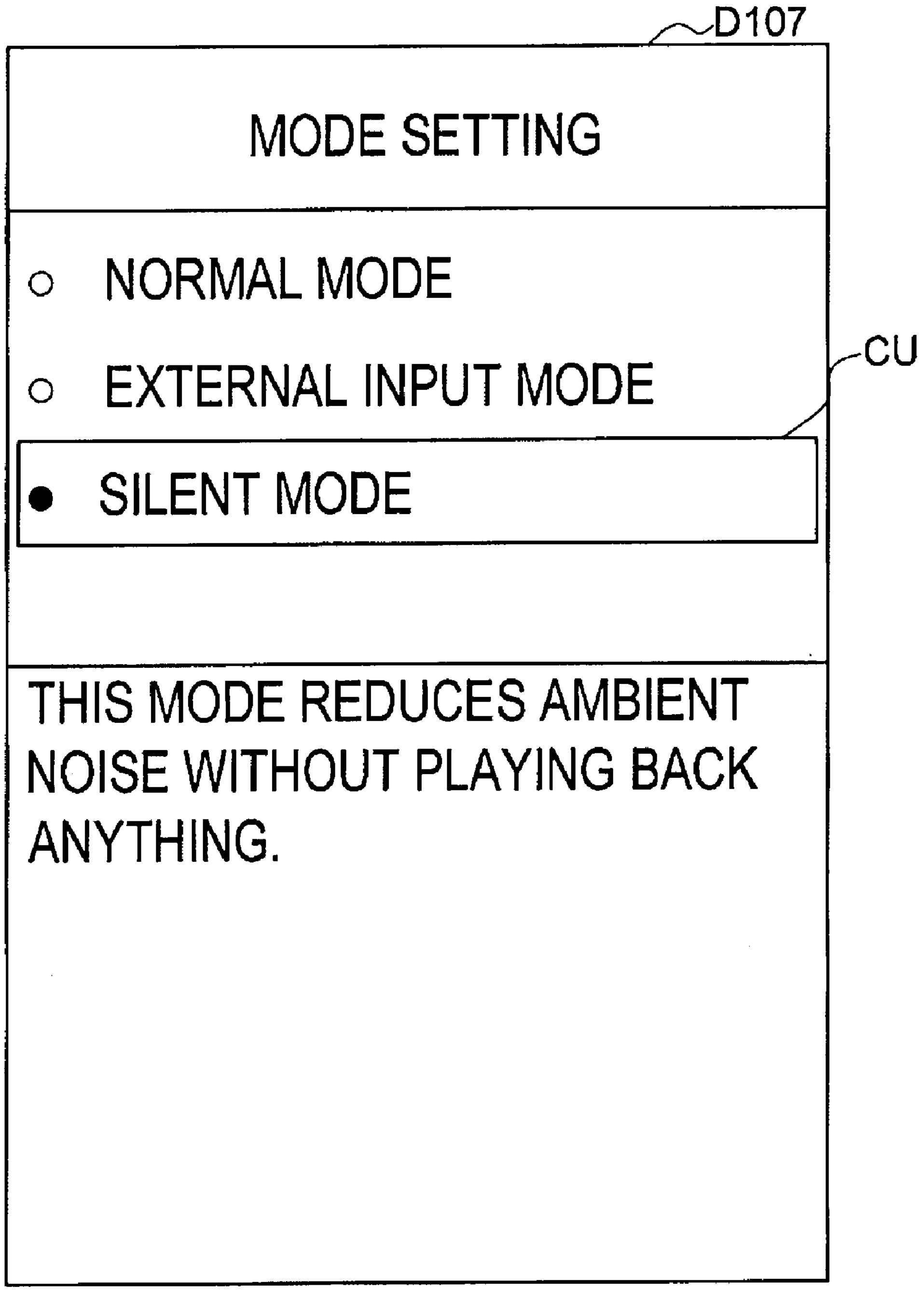
FIG. 9C is an explanatory figure that illustrates a display image displayed on the display portion by the operation of the playback device according to the first embodiment.

A plurality of selectable items are displayed in the image D101, as shown in FIG. 8A. When the cursor CU moves and an item "various settings" is selected, an image D103 shown in FIG. 8B is displayed. A plurality of selectable items are also displayed in the image D103. If an item "noise cancellation setting" is selected from these items, an image D105 shown in FIG. 8C is displayed. A plurality of selectable items are also displayed in the image D105. If an item "mode setting" is selected from these items, an image D107 shown in FIG. 9A to FIG. 9C is displayed. If the NC function is turned OFF at the above step S101, it is preferable that the item "mode setting" in the image D105 "noise cancellation setting" shown in FIG. 8C is grayed out. If the user selects the item "mode setting" in the grayed-out state, it is preferable that a message like "please turn on NC" is displayed on the display portion 11 or output as a voice message.

In the image D107 "mode setting" shown in FIG. 9A to FIG. 9C, selectable modes, namely, the "normal mode", the "external input mode", and the "silent mode" are displayed as selectable items. Further, a description that explains the mode corresponding to the item at which the cursor CU is placed is displayed on a lower section of the display portion 11 as supplementary user information (Help). Note that, it is preferable that the item "external input mode" among the items shown in FIG. 9A to FIG. 9C is grayed out if the above-described process at step S109 has been performed and the external input mode has been deactivated. If the user selects the item "external input mode" in the grayed-out state, it is preferable that a message like "please connect an external device" is displayed on the display portion 11 or output as a voice message.

When the item "normal mode" is selected as shown in FIG. 9A, a signal corresponding to the normal mode is output from the operation portion 12 as a mode selection signal, and the mode setting portion 113 sets the normal mode. When the item "external input mode" is selected as shown in FIG. 9B, a signal corresponding to the external input mode is output from the operation portion 12 as a mode selection signal, and the mode setting portion 113 sets the external input mode. When the item "silent mode" is selected as shown in FIG. 9C, a signal corresponding to the silent mode is output from the operation portion 12 as a mode selection signal, and the mode setting portion 113 sets the silent mode.

Operation in the Normal Mode

Next, an operation of the playback device 10 in each mode will be described.

Figure 5:
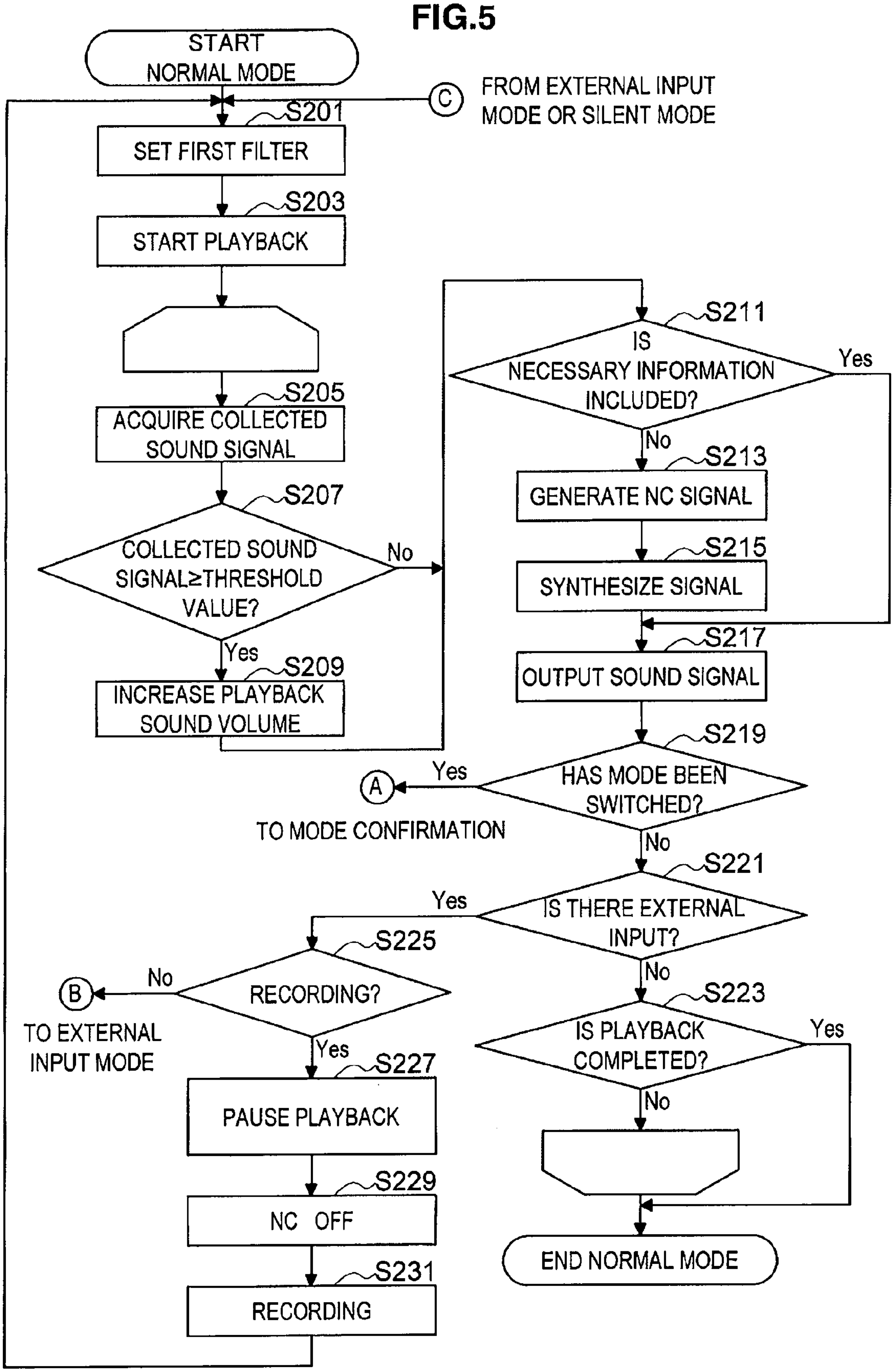
FIG. 5 is a flowchart that illustrates the operation of the playback device according to the first embodiment.

As shown in FIG. 5, when the normal mode is set, first, a process at step S201 is performed. At step S201, the NC signal generating portion 164 sets the first filter recorded in the NC filter storage portion 166 as a filter that is used to generate an NC signal. Then, the process proceeds to step S203.

At step S203, the playback portion 162 starts to play back, for example, content recorded in the content storage portion 161, or a radio signal received by the radio receiving portion 168. Images displayed on the display portion 11 at the start of the playback are shown in FIG. 10A to FIG. 11B.

Figure 10A:
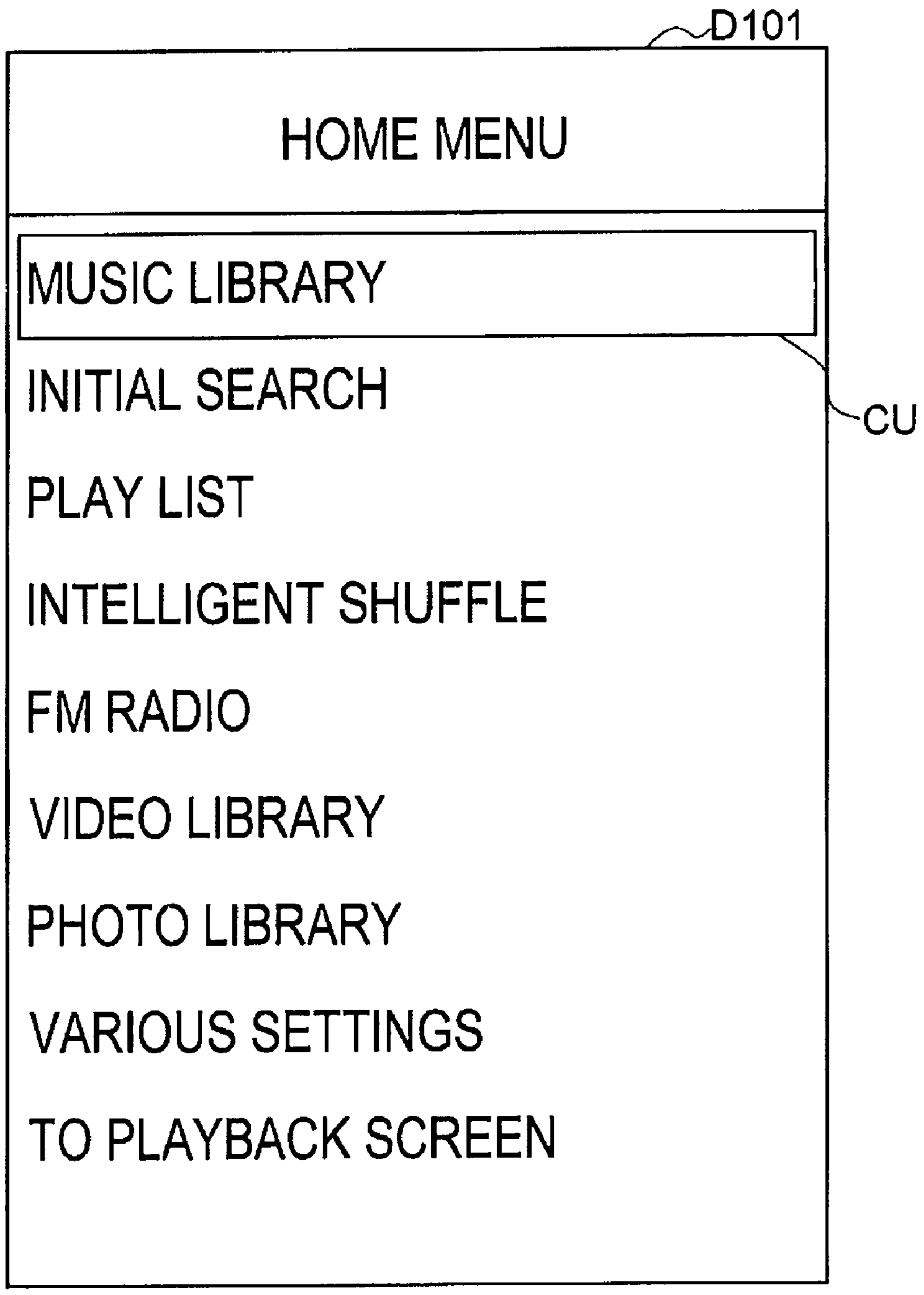
FIG. 10A is an explanatory figure that illustrates a display image displayed on the display portion by the operation of the playback device according to the first embodiment.
Figure 10B:
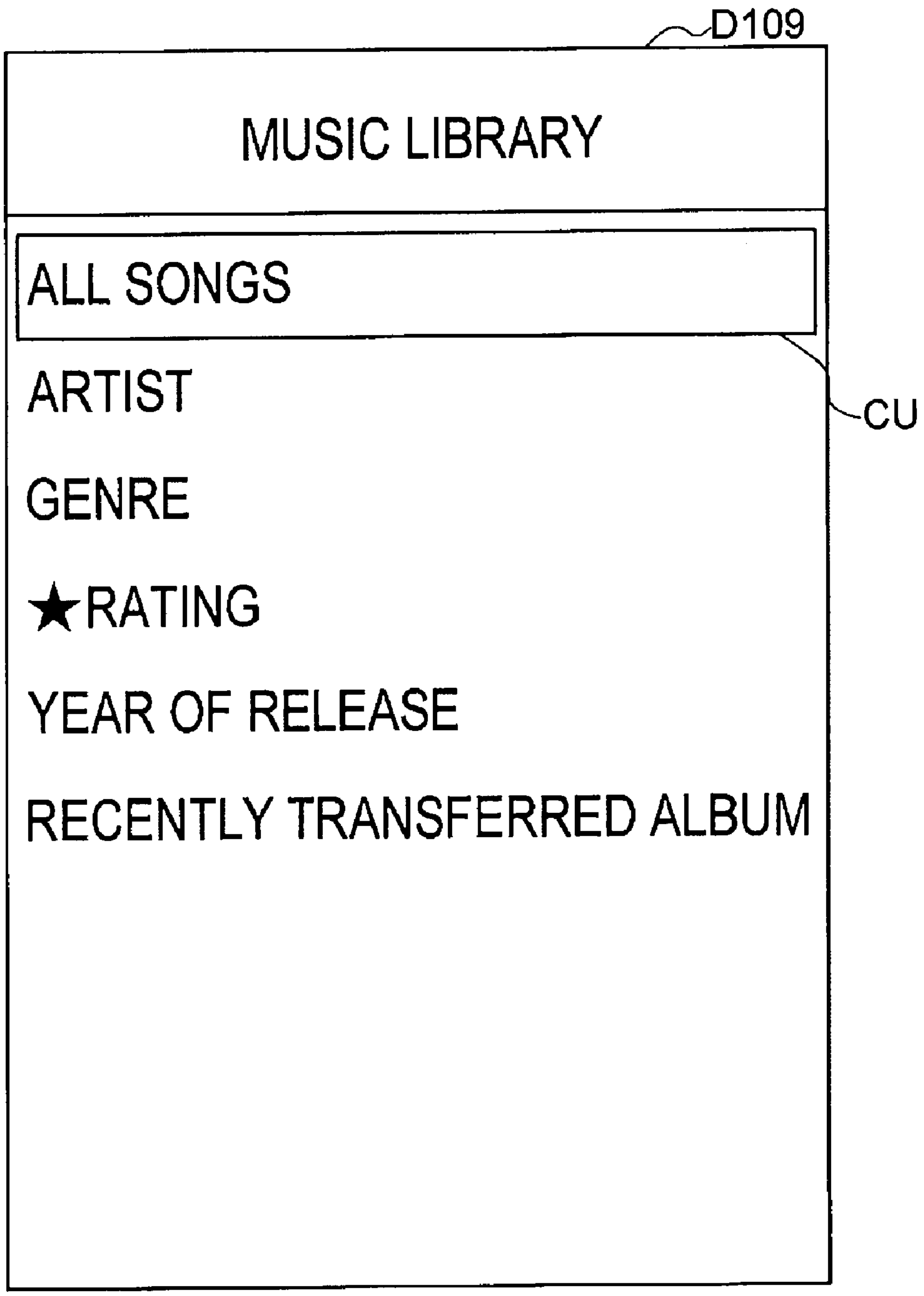
FIG. 10B is an explanatory figure that illustrates a display image displayed on the display portion by the operation of the playback device according to the first embodiment.
Figure 10C:
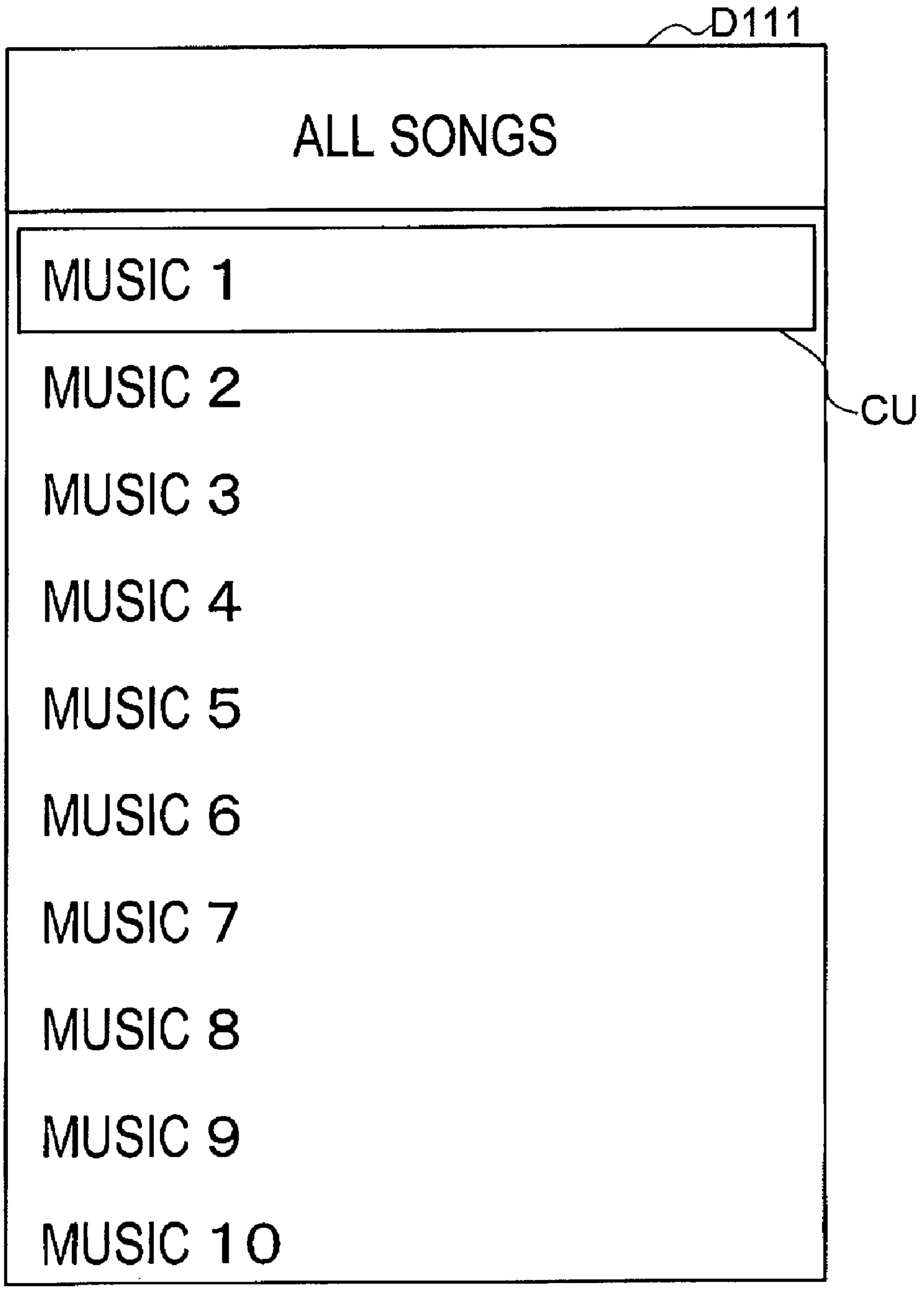
FIG. 10C is an explanatory figure that illustrates a display image displayed on the display portion by the operation of the playback device according to the first embodiment.

First, if an item "music library" is selected in a state where the image D101 "home menu" is displayed as shown in FIG. 10A, an image D109 shown in FIG. 10B is displayed. A plurality of items are also displayed in the image D109 "music library" shown in FIG. 10B. If an item "all music" is selected from these items, an image D111 shown in FIG. 10C is displayed. A plurality of selectable content names are displayed in the image D111. If another item is selected in the image D109 shown in FIG. 10B, selectable content names that meet a condition of the other item only are displayed.

Figure 10D:
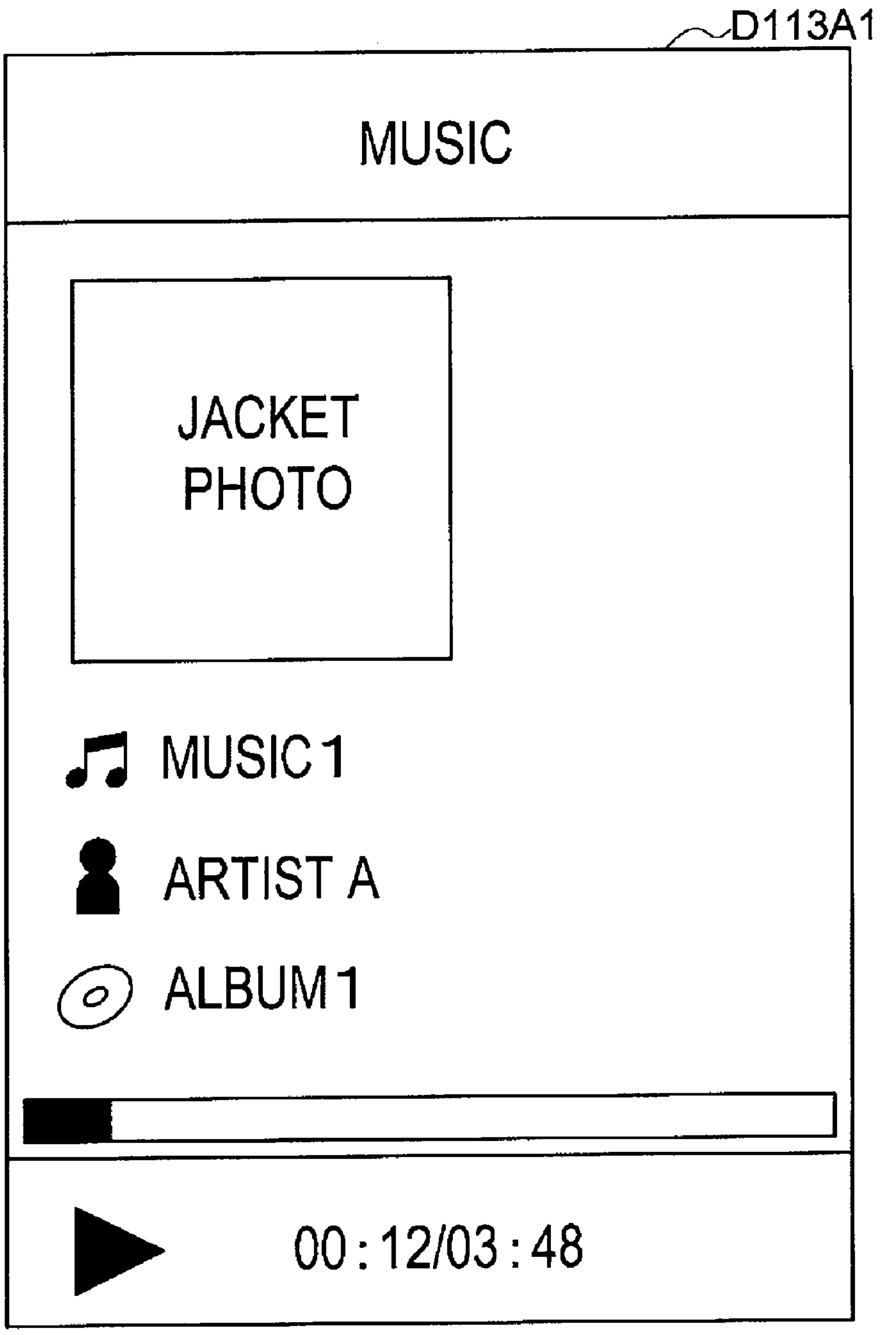
FIG. 10D is an explanatory figure that illustrates a display image displayed on the display portion by the operation of the playback device according to the first embodiment.

When one of the content names (for example, an item "music 1") is selected in the image D111 shown in FIG. 10C, an image D113A1 shown in FIG. 10D is displayed, and the playback portion 162 starts to play back the content (step S203 in FIG. 5).

Figure 11A:
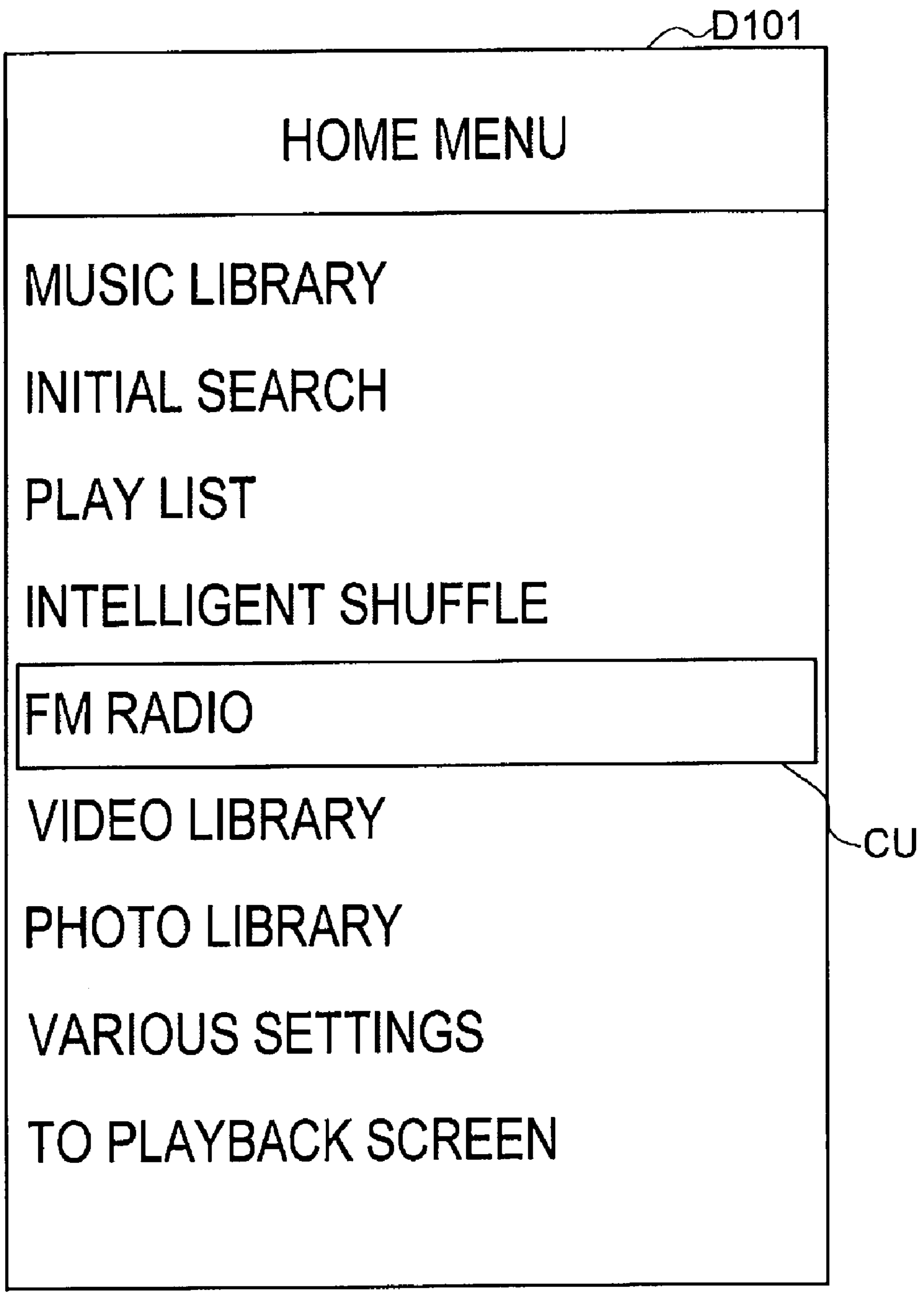
FIG. 11A is an explanatory figure that illustrates a display image displayed on the display portion by the operation of the playback device according to the first embodiment.
Figure 11B:
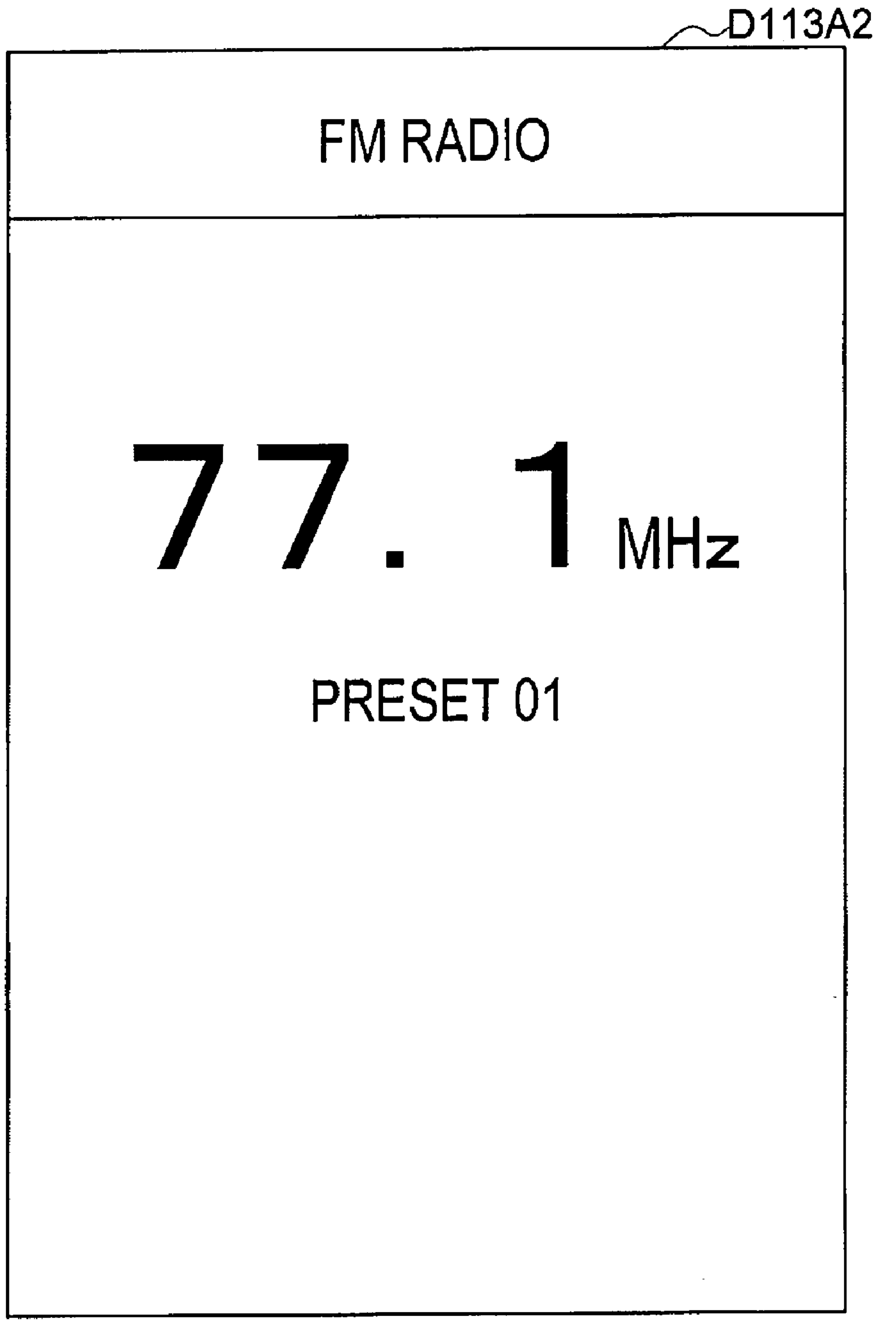
FIG. 11B is an explanatory figure that illustrates a display image displayed on the display portion by the operation of the playback device according to the first embodiment.

On the other hand, the operation when radio is played back is as follows. If an item "FM radio" (another radio such as AM radio is also acceptable) is selected in a state where the image D101 "home menu" is displayed as shown in FIG. 11A, an image D113A2 shown in FIG. 11B is displayed, and the playback portion 162 starts to play back a radio signal (step S203 in FIG. 5).

After the process at step S203 is completed, the process proceeds to step S205, and the collected sound signal acquisition portion 132 acquires a collected sound signal from the sound collecting microphones 22. Then, the process proceeds to step S207.

At step S207, the control portion 110 determines whether or not the value of the collected sound signal is equal to or larger than a predetermined threshold value (for example, a threshold value recorded in the control information storage portion (not shown in the figures)). That is, the control portion 110 determines whether or not the value of the ambient noise is larger than an allowable value. The allowable value may represent the magnitude of the noise that can be appropriately removed by the NC function. When the value of the collected sound signal is smaller than the threshold value, the process proceeds to step S211. On the other hand, when the value of the collected sound signal is equal to or larger than the threshold value, step S209 is performed before step S211. At step S209, the control portion 110 increases the magnitude of the audio signal that is output by the playback operation of the playback portion 162. That is, the playback portion 162 increases the playback sound volume. With this configuration, when the collected noise is larger than the noise that can be appropriately removed by the NC function, the playback sound volume can be increased. Accordingly, the sound is not masked by the noise, and the user can enjoy the audio of the content (or the radio) at a comfortable volume. Note that the processes at step S207 and step S209 do not necessarily have to be performed, and step S211 may be performed after performing step S205.

After the process at step S207 or step S209 is completed, the process proceeds to step S211. At step S211, the information recognition portion 112 determines whether or not the collected sound signal includes information necessary for the user. When the collected sound signal includes necessary information, the process proceeds to step S217 without performing step S213 and step S215, which are described later. With this configuration, the NC function, which is performed at the later-described step S213 and step S215, can be temporarily turned OFF. Thus, it is possible to inhibit the noise including information necessary for the user from being removed. That is, while removing unnecessary noise, if noise includes necessary information, the playback device 10 can provide the information to the user without removing it. On the other hand, when the collected sound signal does not include necessary information, the process proceeds to step S213. Note that, the process at step S211 does not necessarily have to be performed, and step S213 may be performed after performing step S207 or step S209.

At step S213, the NC signal generating portion 164 generates an NC signal from a collected sound signal by using a set filter. Note that, here, the first filter has been set (refer to step S201). Then, the process proceeds to step S215, and the signal synthesizing portion 165 synthesizes the NC signal with the signal that the switching portion 163 outputs according to the set mode, i.e., in the normal mode, with the audio signal output from the playback portion 162. After that, the process proceeds to step S217, and the synthesized signal is output as a sound signal to the audio output portions 21 of the earphone 20. Thus, the user can hear the sound (audio) output by the sound signal that is generated by synthesizing the audio signal and the NC signal. After the process at step S217 is completed, the process proceeds to step S219.

At step S219, the mode setting portion 113 confirms whether or not the mode switching has been performed. In other words, it is confirmed whether or not the operation portion 12 has output a new mode selection signal according to a user operation.

Figure 12:
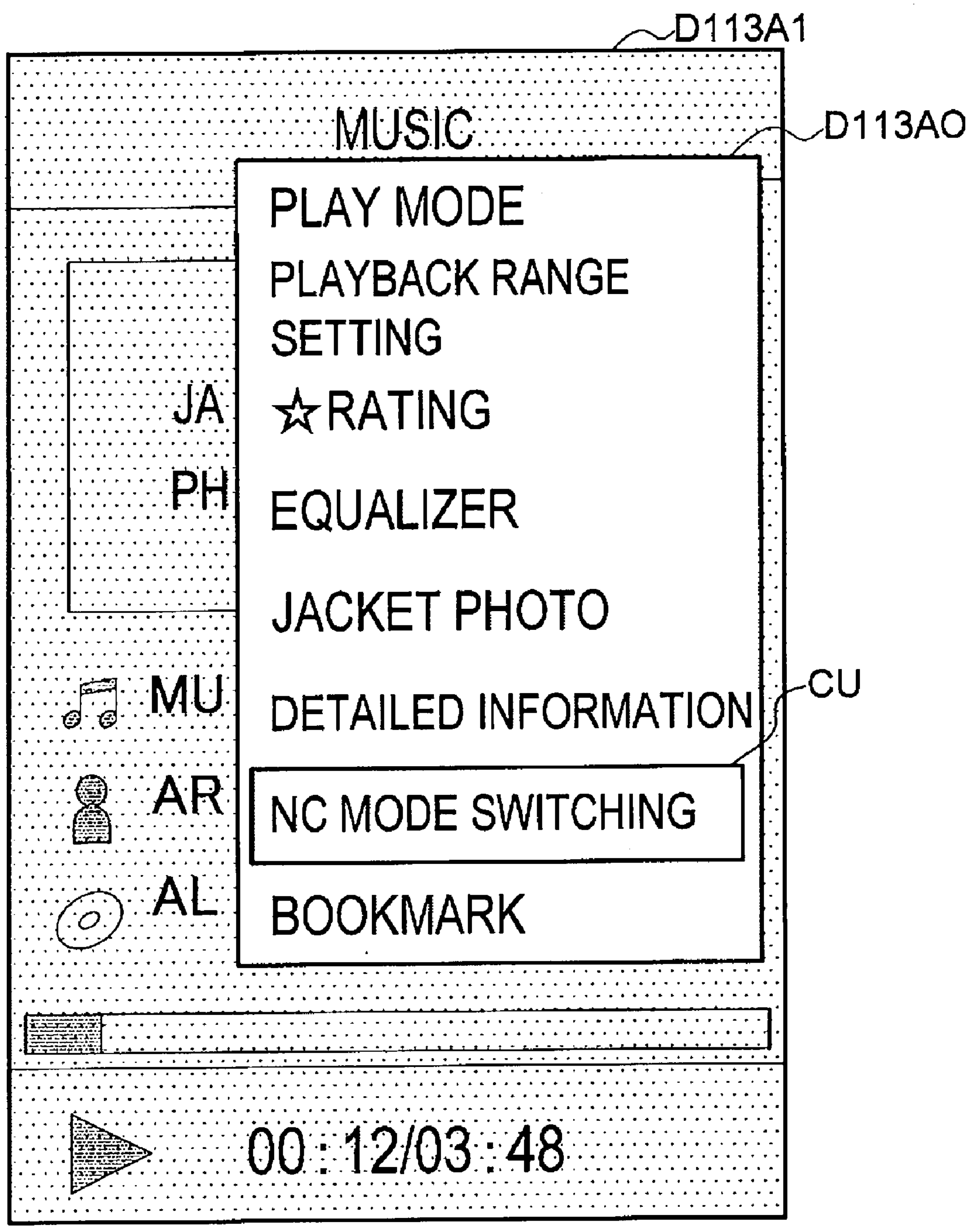
FIG. 12 is an explanatory figure that illustrates a display image displayed on the display portion by the operation of the playback device according to the first embodiment.

FIG. 11A and FIG. 12 show images that are displayed on the display portion 11 when the operation portion 12 outputs a new mode selection signal according to a user operation. In a state where the image D113A1 shown in FIG. 10D during playback is displayed, if the operation portion 12 outputs an option signal, which is one of the operation signals, according to a user operation, the display control portion 111 displays an image D113AO shown in FIG. 12. The image D113AO indicates an "option menu" that displays items selectable in that state. If an item "NC mode switching" is selected from these items, the "mode selection" screen D107 shown in FIG. 9A to FIG. 9C is displayed, and the operation portion 12 outputs a mode selection signal according to a user operation.

When the mode switching has been performed at step S219, the process proceeds to A (namely, mode setting at step S115 in FIG. 4). On the other hand, when the mode switching has not been performed at step S219, the process proceeds to step S221.

At step S221, the control portion 110 confirms whether or not the external signal acquisition portion 141 has acquired an external signal from the external device 40. When the external signal has not been acquired, the process proceeds to step S223. When the external signal has been acquired, the process proceeds to step S225.

When the external signal has not been acquired and the process proceeds to step S223, the control portion 110 determines at step S223 whether or not the playback portion 162 has completed playback of the content (or the radio). When the playback of the content has been completed, the control portion 110 ends the normal mode. When the playback of the content has not been completed, the process proceeds to step S205 again, and the processes from step S205 are repeated.

On the other hand, when the external signal has been acquired and the process proceeds to step S225, the control portion 110 determines at step S225 whether or not the operation portion 12 has output a recording signal, which is one of the operation signals, according to a user operation. This determination indicates whether or not the user is attempting to record an external signal. When the recording signal has been output, the process proceeds to step S227. When the recording signal has not been output, the process proceeds to B (namely, the external input mode shown in FIG. 6).

When the operation portion 12 has output the recording signal and the process proceeds to step S227, at step S227, the control portion 110 causes the playback portion 162 to pause playback. Then, the process proceeds to step S229, and the NC signal generation portion 164 is temporarily turned OFF by the control portion 110. Then, the process proceeds to step S231, and the recording portion 167 is driven by the control portion 110, and the recording portion 167 causes the content storage portion 161 to record the external signal input from outside. At this time, the recording portion 167 may cause the content storage portion 161 to record the external signal after encoding it to a predetermined recording format. After the process at step S231, that is, when the recording is completed and the external signal is not acquired, the process proceeds to step S201. Note that step S225 to step S231 do not necessarily have to be performed, and it is also possible to proceed to B after performing step S221.

Operation in the External Input Mode

Next, an operation of the playback device 10 in the external input mode will be described.

Figure 13:
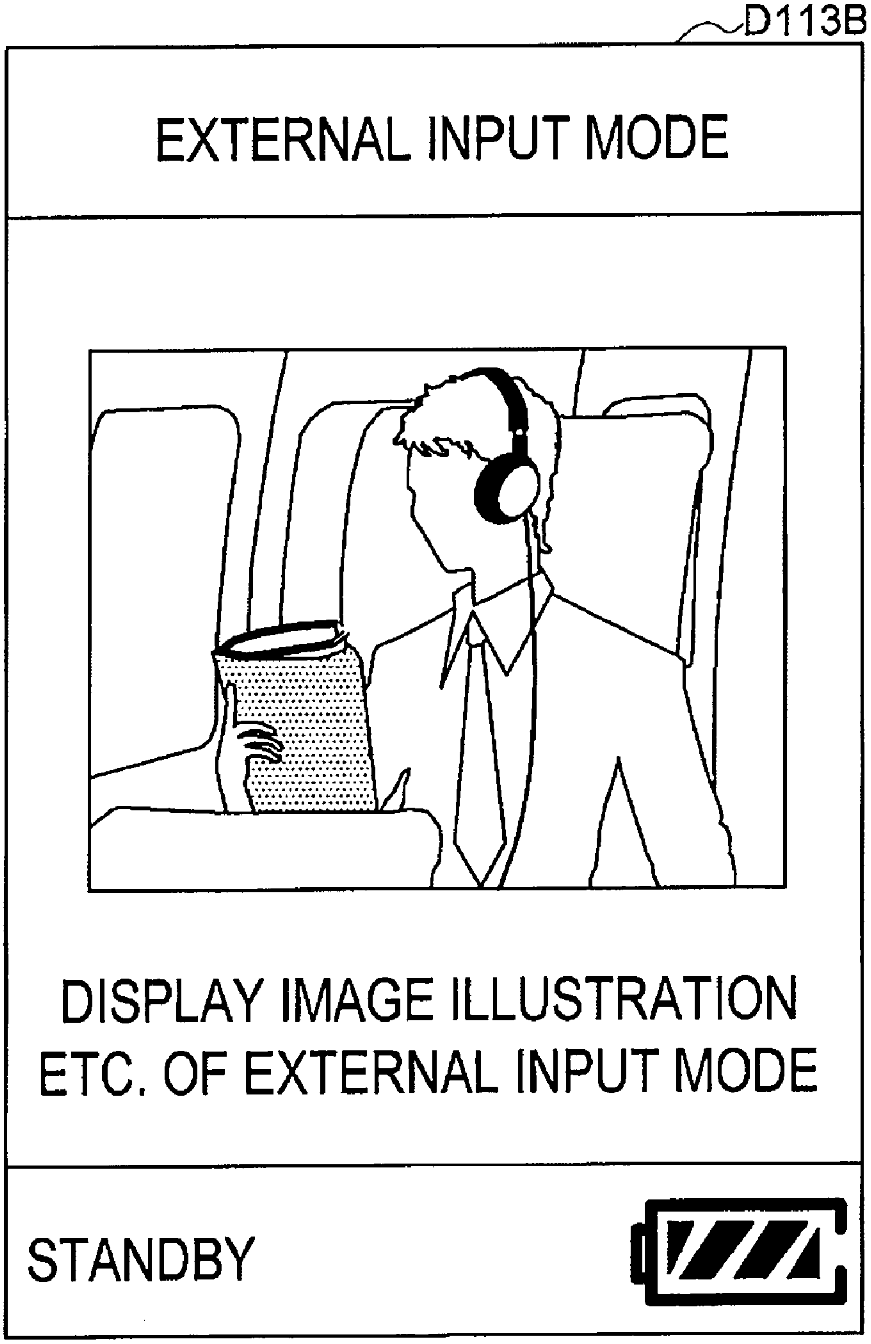
FIG. 13 is an explanatory figure that illustrates a display image displayed on the display portion by the operation of the playback device according to the first embodiment.

When the external input mode is set, an image D113B “external input mode” shown in FIG. 13 is displayed on the display portion 11. The external input mode is set at step S115 (mode setting) in FIG. 4, or set when it is determined at step S221 in FIG. 5 that there is an external input during playback of content and it is determined at step S225 in FIG. 5 that recording is not being performed.

The image D113B shown in FIG. 13 may be displayed or updated, for example, at predetermined time intervals. The updating of the image in this manner can notify that the playback device 10 is being driven in the external input mode and the NC function is operating normally.

Figure 6:
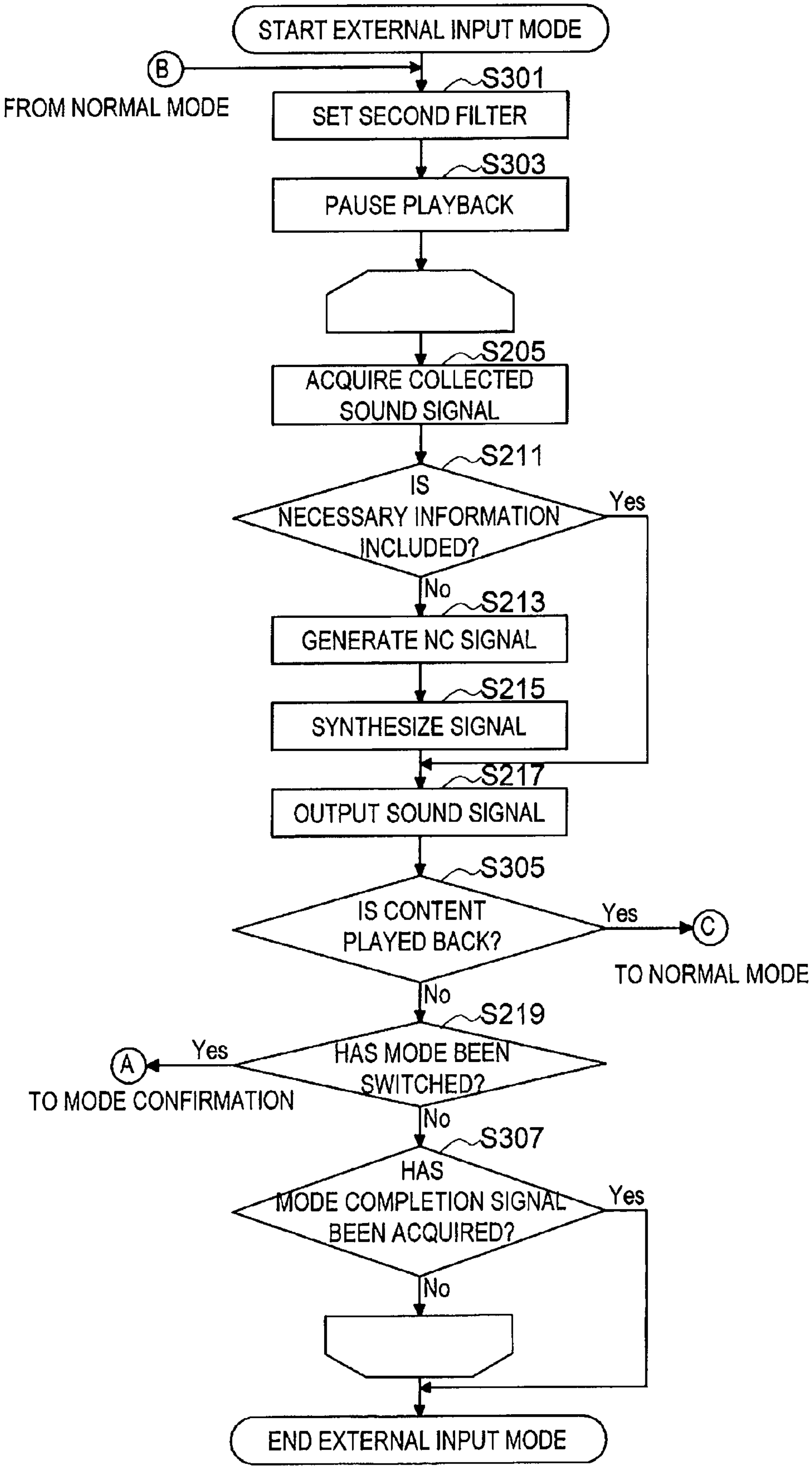
FIG. 6 is a flowchart that illustrates the operation of the playback device according to the first embodiment.

When the external input mode is set, as shown in FIG. 6, first, the process at step S301 is performed. At step S301, the second filter recorded in the NC filter storage portion 166 is set as a filter that is used by the NC signal generating portion 164 to generate an NC signal. Then, the process proceeds to step S303.

At step S303, if the playback portion 162 is performing playback, the control portion 110 causes the playback portion 162 to pause the playback. Then, the process proceeds to step S205, and the collected sound signal acquisition portion 132 acquires a collected sound signal from the sound collection microphones 22. Then, the process proceeds to step S211.

At step S211, the information recognition portion 112 determines whether or not the collected sound signal includes information necessary for the user. When the collected sound signal includes necessary information, the process skips step S213 and step S215, and proceeds to step S217. On the other hand, when the collected sound signal does not include necessary information, the process proceeds to step S213. Note that, the process at step S211 does not necessarily have to be performed, and step S213 may be performed after performing step S205.

At step S213, the NC signal generating portion 164 generates an NC signal from a collected sound signal by using a set filter. Note that, here, the second filter has been set (refer to step S301). Then, the process proceeds to step S215, and the signal synthesizing portion 165 synthesizes the NC signal with the signal that the switching portion 163 outputs according to the set mode, i.e., in the external input mode, with the external signal acquired by the external signal acquisition portion 141. After that, the process proceeds to step S217, and the synthesized signal is output as a sound signal to the audio output portions 21 of the earphone 20. Thus, the user can hear the sound (audio) output by the sound signal that is generated by synthesizing the external signal and the NC signal. At this time, the playback device 10 may amplify the sound volume of the external signal before sound output by using, for example, a separate amplifier (not shown in the figures) provided in the playback device 10. Further, the playback device 10 may perform an equalizing process in which a sound effect is added to the external signal by using, for example, a separate signal processing portion (not shown in the figures) provided in the playback device 10. After the process at step S217 is completed, the process proceeds to step S305.

At step S305, the control portion 110 confirms whether or not the playback portion 162 has started (or resumed) playback. The displayed images and the operation when the playback portion 162 starts playback are the same as the images shown in FIG. 10A to FIG. 10D (playback of content) and the images shown in FIG. 11A and FIG. 11B (playback of radio), and as the operation illustrated in these figures. When the playback of content (or radio) has been started, the process proceeds to C (step S201 (set first filter) of the operation in the normal mode shown in FIG. 5). That is, the mode setting portion 113 automatically switches the mode to the normal mode when content (or radio) is played back in the external input mode, and starts the processes in the normal mode shown in FIG. 5. Note that, when the content during playback has been paused at step S303, playback of the content is resumed at step S203 (start playback) shown in FIG. 5 from the position at which the content has been paused. By performing pause and playback in this manner, the playback device 10 can resume playback. On the other hand, when playback is not started, the process proceeds to step S219.

At step S219, the mode setting potion 113 confirms whether or not the mode switching has been performed. In other words, it is confirmed whether or not the operation portion 12 has output a new mode selection signal according to a user operation.

Figure 14:
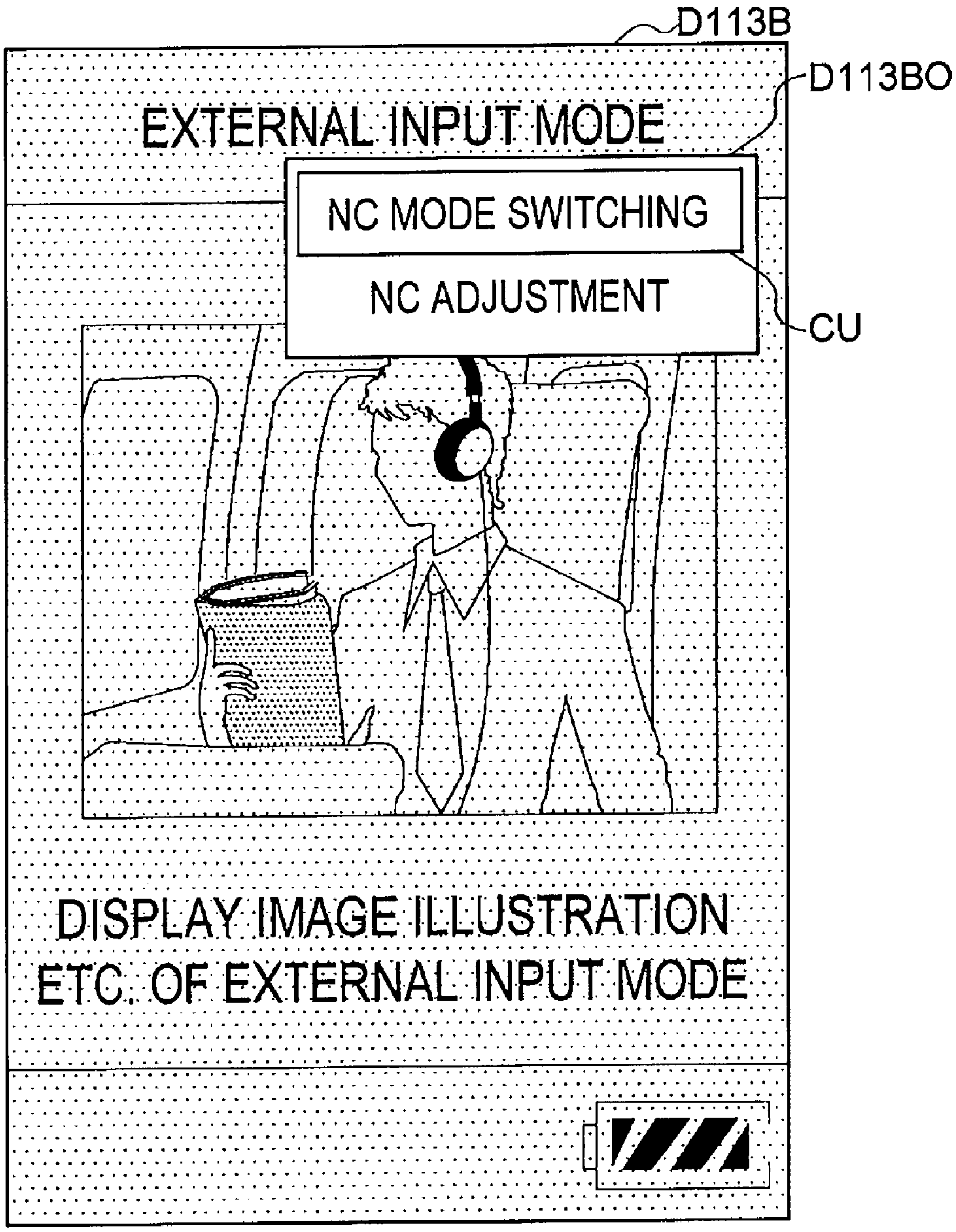
FIG. 14 is an explanatory figure that illustrates a display image displayed on the display portion by the operation of the playback device according to the first embodiment.

FIG. 13 and FIG. 14 show images that are displayed on the display portion 11 when the operation portion 12 outputs a new mode selection signal according to a user operation. In a state where the image D113B “external input mode” shown in FIG. 13 is displayed, if the operation portion 12 outputs an option signal, which is one of the operation signals, according to a user operation, the display control portion 111 displays an image D113BO shown in FIG. 14. The image D113BO indicates an “option menu” that displays items selectable in that state. If an item “NC mode switching” is selected from these items, the “mode selection” screen D107 shown in FIG. 9A to FIG. 9C is displayed, and the operation portion 12 outputs a mode selection signal according to a user operation.

When the mode has been switched at step S219, the process proceeds to A (namely, mode setting at step S115 in FIG. 4). On the other hand, when the mode has not been switched at step S219, the process proceeds to step S307.

At step S307, it is determined whether or not the control portion 110 has acquired a mode completion signal. When the control portion 110 has acquired the mode completion signal, the external input mode is terminated. On the other hand, when the control portion 110 has not acquired the mode completion signal, the process proceeds to step S205 again, and the processes from step S205 are repeated.

The mode completion signal is output when the mode currently set is reset. That is, when the power source of the playback device 10 is turned OFF, the set mode is not reset unless the mode completion signal is output. Therefore, even when the power source of the playback device 10 is turned OFF, if the mode completion signal is not output, the set external input mode will be maintained when the power source of the playback device 10 is turned ON next. Note that, the operation portion 12 may output the mode completion signal, for example, according to a user operation. Alternatively, the control portion 110 may generate the mode completion signal automatically when an external signal is not input for a certain period of time, or using a timer function, for example. However, cases where the mode completion signal is output or generated are not limited to these examples. For example, the external input mode may be maintained until content is played back at step S305 without generation of the mode completion signal, or until the mode is switched at step S219.

Operation in the Silent Mode

Next, an operation of the playback device 10 in the silent mode will be described.

Figure 15:
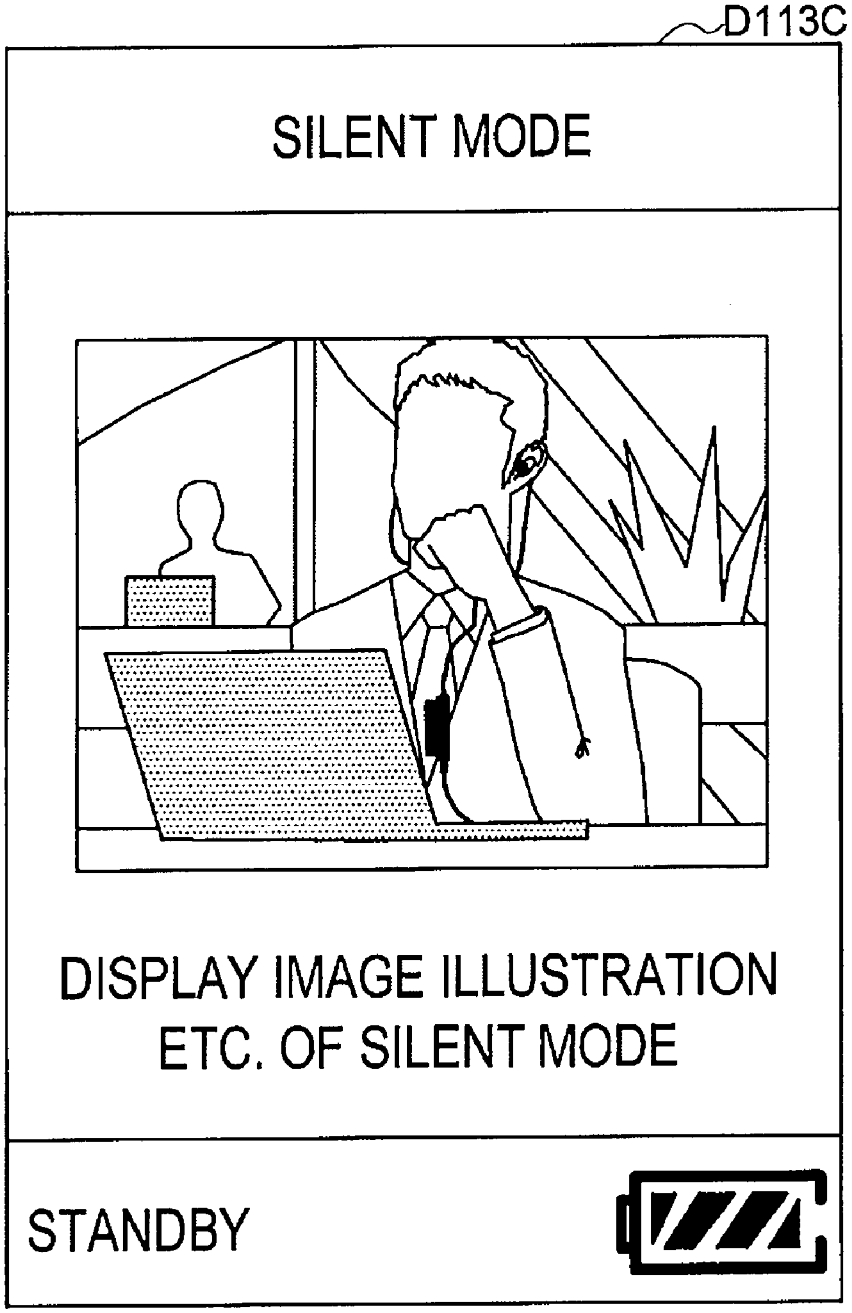
FIG. 15 is an explanatory figure that illustrates a display image displayed on the display portion by the operation of the playback device according to the first embodiment.

When the silent mode is set, an image D113C "silent mode" shown in FIG. 15 is displayed on the display portion 11. This mode is set when the silent mode is set at step S115 (mode setting) in FIG. 4.

The image D113C shown in FIG. 15 may be displayed or updated, for example, at predetermined time intervals. The updating of the image in this manner can notify that the playback device 10 is being driven in the silent mode and the NC function is operating normally.

Figure 7:
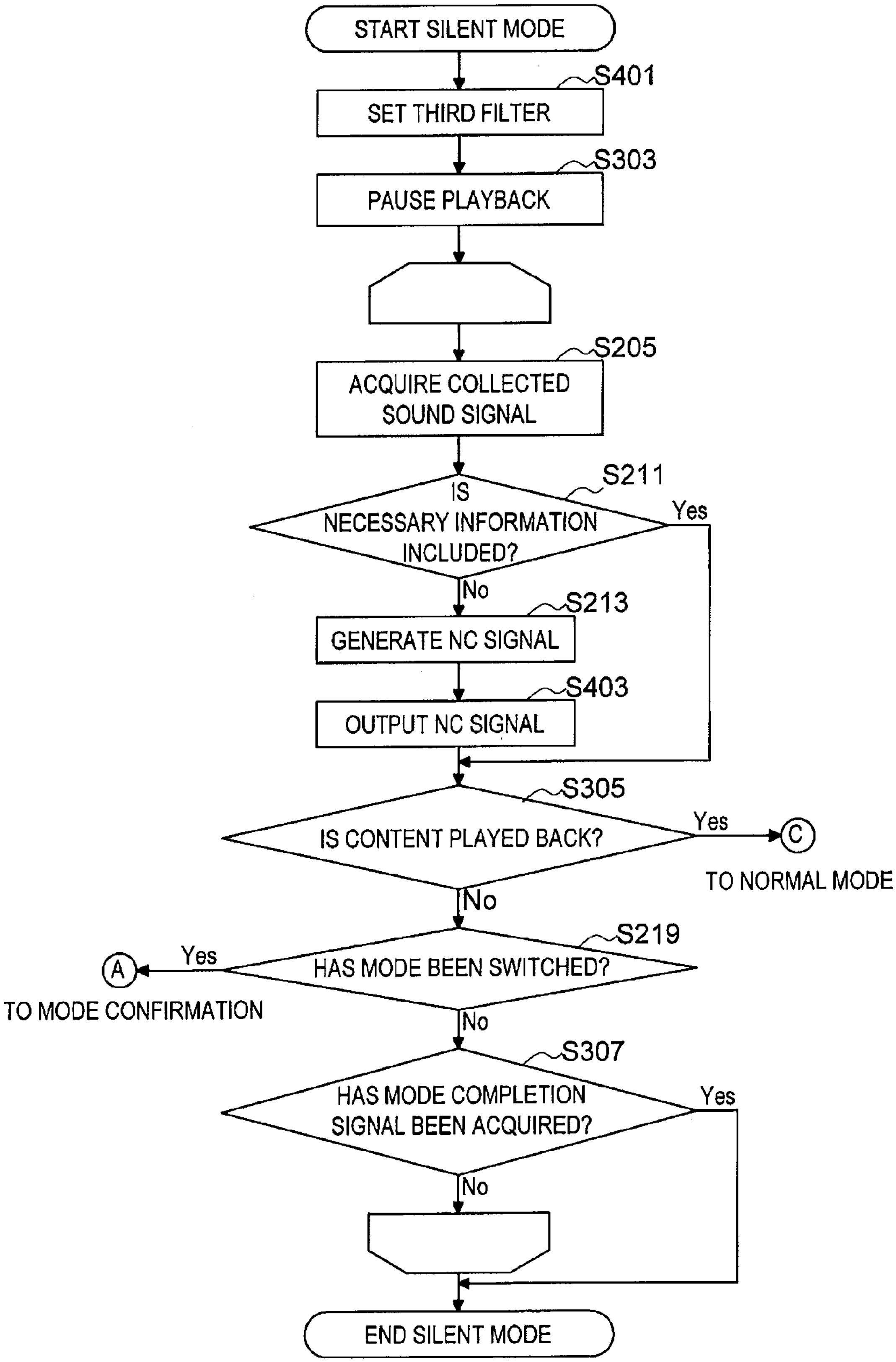
FIG. 7 is a flowchart that illustrates the operation of the playback device according to the first embodiment.

When the silent mode is set, first, the process at step S401 is performed, as shown in FIG. 7. At step S401, the third filter recorded in the NC filter storage portion 166 is set as a filter that is used by the NC signal generating portion 164 to generate an NC signal. Then, the process proceeds to step S303.

At step S303, if the playback portion 162 is performing playback, the control portion 110 causes the playback portion 162 to pause the playback. Then, the process proceeds to step S205, and the collected sound signal acquisition portion 132 acquires a collected sound signal from the sound collection microphones 22. Then, the process proceeds to step S211.

At step S211, the information recognition portion 112 determines whether or not the collected sound signal includes information necessary for the user. When the collected sound signal includes necessary information, the process skips step S213 and step S403, which is described later, and proceeds to step S305. On the other hand, when the collected sound signal does not include necessary information, the process proceeds to step S213. Note that, the process at step S211 does not necessarily have to be performed also in this case, and step S213 may be performed after performing step S205.

At step S213, the NC signal generating portion 164 generates an NC signal from a collected sound signal by using a set filter. Note that, here, the third filter has been set (refer to step S401). Then, the process proceeds to step S403, and the NC signal generating portion 164 outputs the NC signal to the outside, i.e., to the audio output portions 21 of the earphone 20, via the signal synthesizing portion 165 and the sound signal output portion 131. Thus, the user can hear the sound (audio) output only by the NC signal. With this configuration, the playback device 10 can cancel noise, and therefore, it can operate in the same manner as when earplugs are placed in the user's ears. Note that, as an operating condition at step S403, it is required that the silent mode is set. In other words, when the playback device 10 is not playing back content or the like and the external signal acquisition portion 141 does not acquire an external signal, only the NC signal is output at step S403. After performing step S403, the process proceeds to step S305.

At step S305, the control portion 110 confirms whether or not the playback portion 162 has started (or resumed) playback. The displayed images and the operation when the playback portion 162 starts playback are the same as the images shown in FIG. 10A to FIG. 10D (playback of content) and the images shown in FIG. 11A and FIG. 11B (playback of radio), and as the operation illustrated in these figures. When the playback of content (or radio) has been started, the process proceeds to C (step S201 (set first filter) of the operation in the normal mode shown in FIG. 5). That is, the mode setting portion 113 automatically switches the mode to the normal mode when content (or radio) is played back in the silent mode, and starts the process in the normal mode shown in FIG. 5. Note that, when the content during playback has been paused at step S303, the playback of the content is resumed at step S203 (start playback) shown in FIG. 5 from the position at which the content has been paused. By performing pause and playback in this manner, the playback device 10 can resume playback. On the other hand, when playback is not started, the process proceeds to step S219.

At step S219, the mode setting potion 113 confirms whether or not the mode switching has been performed. In other words, it is confirmed whether or not the operation portion 12 has output a new mode selection signal according to a user operation.

When the operation portion 12 outputs a new mode selection signal according to a user operation, the image displayed on the display portion 11 is the same as the image D113BO shown in FIG. 14 in the external input mode. The operation at this time is the same as that in the external input mode. Therefore, a detailed description is omitted here.

When the mode has been switched at step S219, the process proceeds to A (namely, mode setting at step S115 in FIG. 4). On the other hand, when the mode has not been switched at step S219, the process proceeds to step S307.

At step S307, it is determined whether or not the control portion 110 has acquired a mode completion signal. When the control portion 110 has acquired the mode completion signal, the silent mode is terminated. On the other hand, when the control portion 110 has not acquired the mode completion signal, the process proceeds to step S205 again, and the processes from step S205 are repeated.

This mode completion signal is also output when the mode currently set is reset. That is, when the power source of the playback device 10 is turned OFF, the set mode is not reset unless the mode completion signal is output. Therefore, even when the power source of the playback device 10 is turned OFF, if the mode completion signal is not output, the set silent mode will be maintained when the power source of the playback device 10 is turned ON next. Note that, the operation portion 12 may output the mode completion signal, for example, according to a user operation. Alternatively, the control portion 110 may generate the mode completion signal automatically, for example, using a timer function. However, cases where the mode completion signal is output or generated are not limited to these examples. For example, the silent mode may be maintained until content is played back at step S305 without generation of the mode completion signal, or until the mode is switched at step S219.

Note that, when the control portion 110 has the above-described timer function, the control portion 110 may perform control such that the mode is switched to the normal mode after a predetermined time has elapsed to play back content, or the mode may be switched to the external input mode to output an external signal. When the playback device 10 operates in this manner, it can have a wake-up function by using the silent mode as a sleep mode for the user.

Examples of the Effect of the Present Embodiment

The playback device 10 according to the present embodiment is described above.

The playback device 10 can perform an NC process even on an external signal input from the external device 40 as described above. In addition, the playback device 10 can operate like earplugs by driving only the NC function. Further, although the switching of these modes can be performed by user selection, it can also be performed automatically according to an operation state of each structural element. Therefore, it is also possible to improve user operability because the user need not change the mode setting. Moreover, by automatically turning ON/OFF the NC function, for example, information necessary for the user is not removed by the NC function, and can be provided to the user.

Second Embodiment

Next, a playback device according to a second embodiment of the present invention will be described. The operation of this playback device further improves user operability, as compared to the operation of the playback device 10 according to the first embodiment. The processes and configuration of the playback device according to the second embodiment can be configured in the same manner as the playback device 10 according to the first embodiment. Therefore, a detailed description thereof is omitted here.

In the above-described playback device 10 of the first embodiment, the step S219 (mode switching) between the normal mode, the external input mode or the silent mode (refer to FIGS. 5 to 7) is performed when the user operates the operation portion 12 and thereby displays the option menu image D113AO or D113BO (refer to FIG. 12 and FIG. 14), and then selects the item "NC mode switching". In the above-described playback device 10 of the first embodiment, even when the power source of the playback device 10 is turned OFF, the mode completion signal is not output and the set mode is not reset. Therefore, when the power source of the playback device 10 is turned ON next, the mode set when the power source is turned OFF will be maintained. The playback device of the second embodiment further simplifies such an operation in particular, thereby reducing an operation load on the user.

First, the images that are displayed on the display portion 11 until step S115 (mode setting) in FIG. 4 will be described with reference to FIG. 16A to FIG. 16F. FIG. 16A to FIG. 16F are explanatory figures that each illustrate a display image displayed on the display portion by an operation of the playback device according to the second embodiment of the present invention.

Figure 16A:
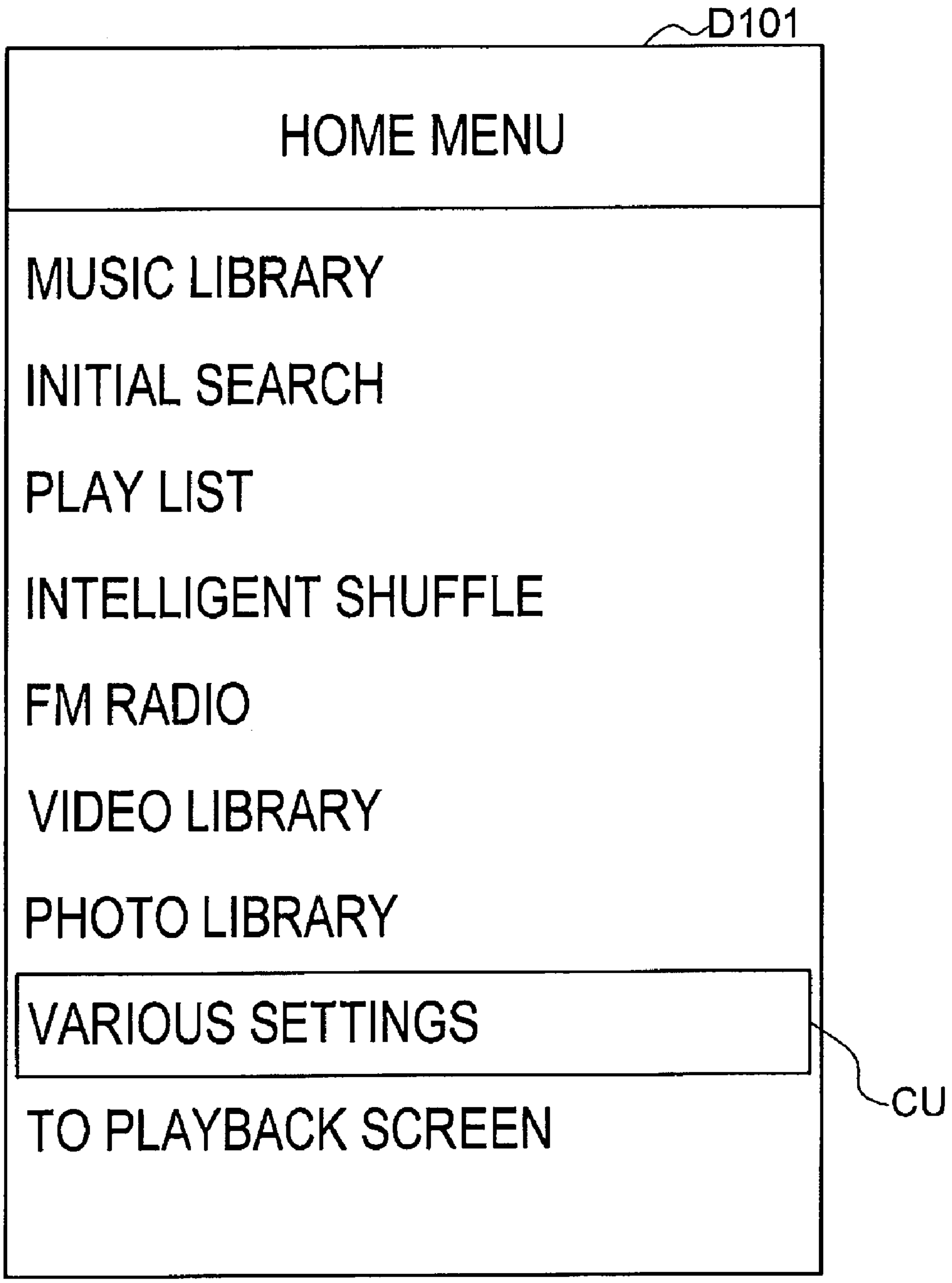
FIG. 16A is an explanatory figure that illustrates a display image displayed on the display portion by an operation of a playback device according to a second embodiment of the present invention.
Figure 16B:
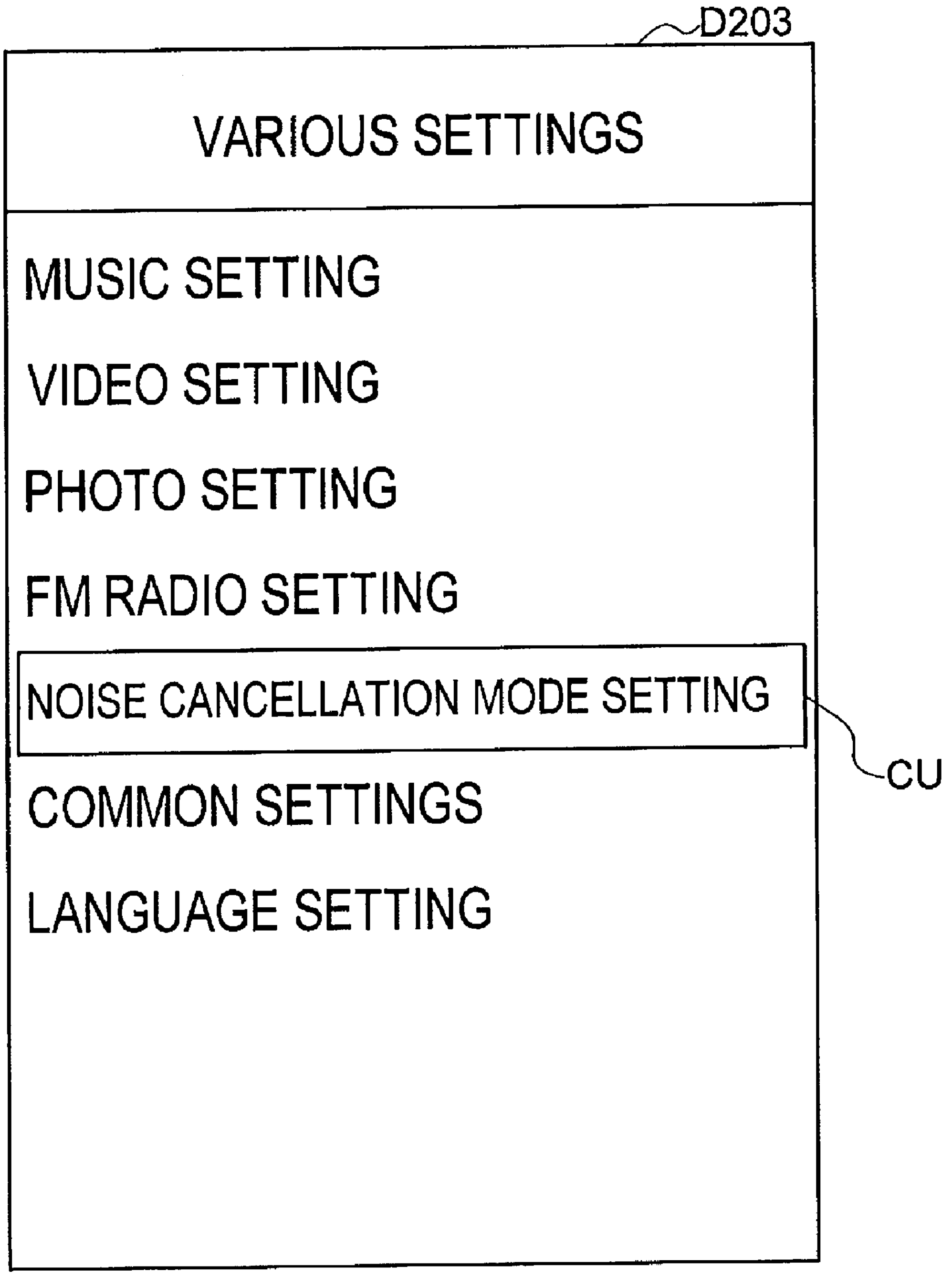
FIG. 16B is an explanatory figure that illustrates a display image displayed on the display portion by the operation of the playback device according to the second embodiment.

First, the image D101 "home menu" shown in FIG. 16A is displayed on the display portion 11. This display screen is the same as the image D101 shown in FIG. 8A that is displayed by the playback device 10 according to the first embodiment. Then, if the item "various settings" is selected, an image D203 shown in FIG. 16B is displayed. A plurality of selectable items are also displayed in the image D203. Instead of the item "noise cancellation setting" shown in FIG. 8B, an item "noise cancellation mode setting" is displayed. If the item "noise cancellation mode setting" is selected, an image D205 shown in FIG. 16C is displayed.

A plurality of selectable items are also displayed in the image D205 "noise cancellation mode setting". However, the item "normal mode" displayed in the image D105 shown in FIG. 8C is not displayed.

Figure 16C:
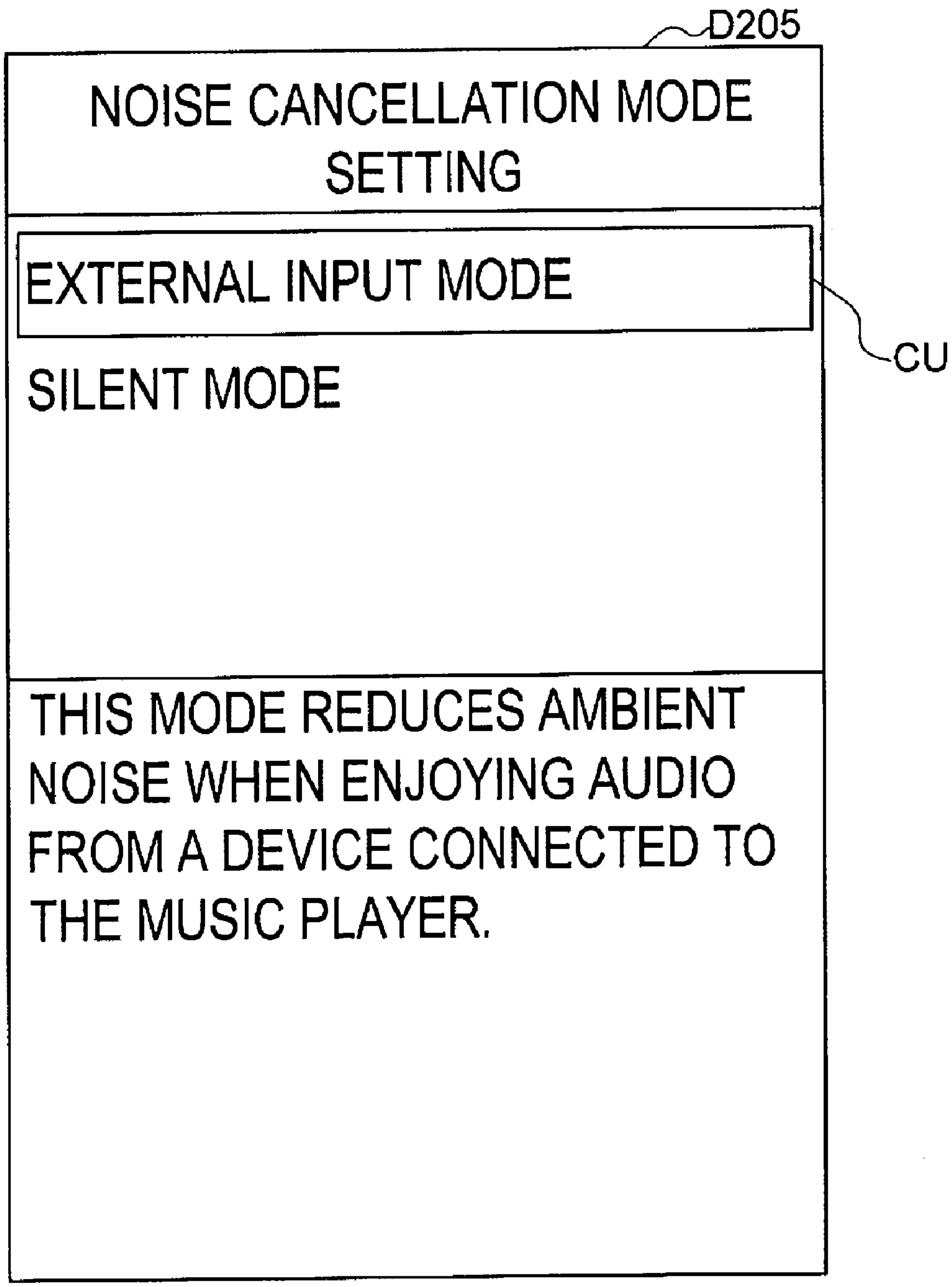
FIG. 16C is an explanatory figure that illustrates a display image displayed on the display portion by the operation of the playback device according to the second embodiment.
Figure 16D:
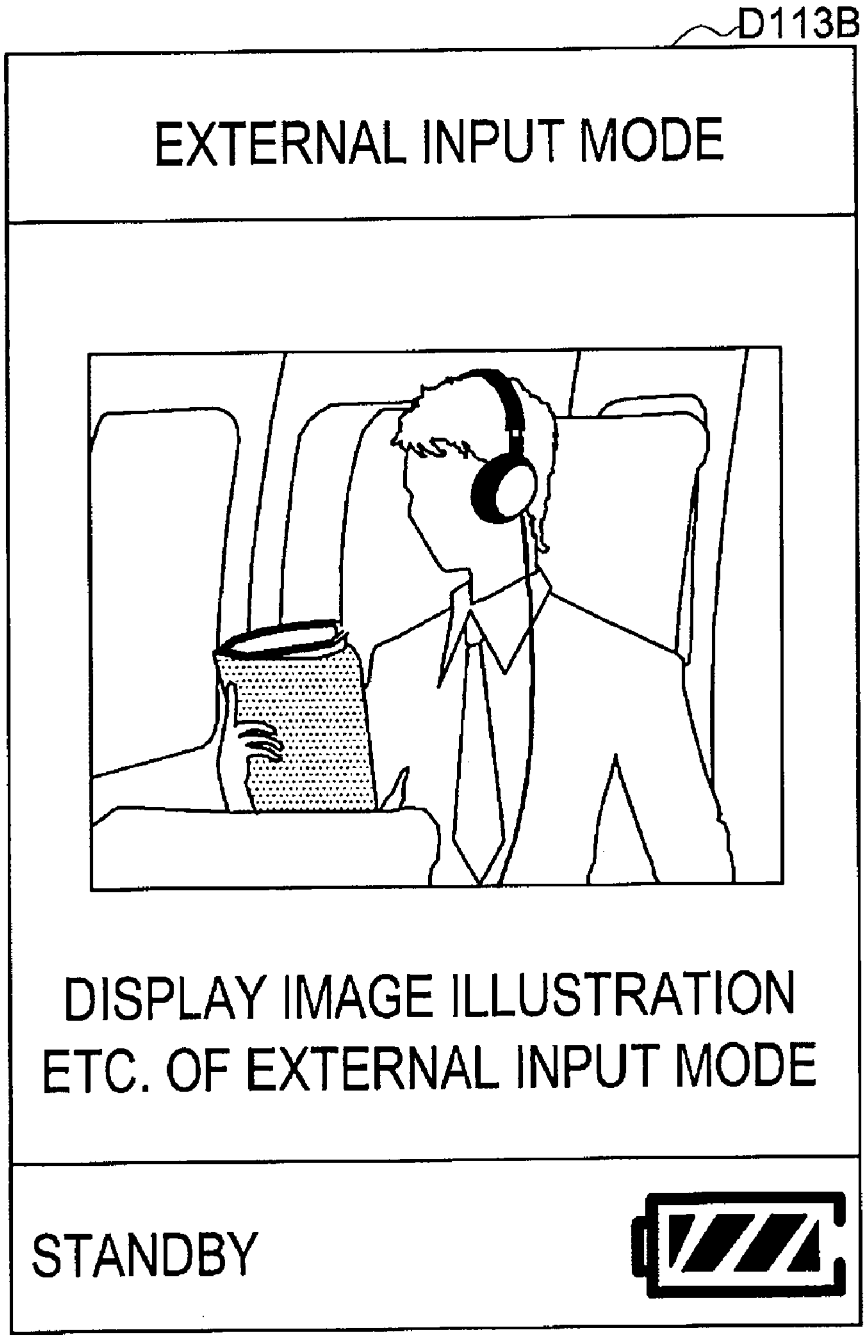
FIG. 16D is an explanatory figure that illustrates a display image displayed on the display portion by the operation of the playback device according to the second embodiment.
Figure 16E:
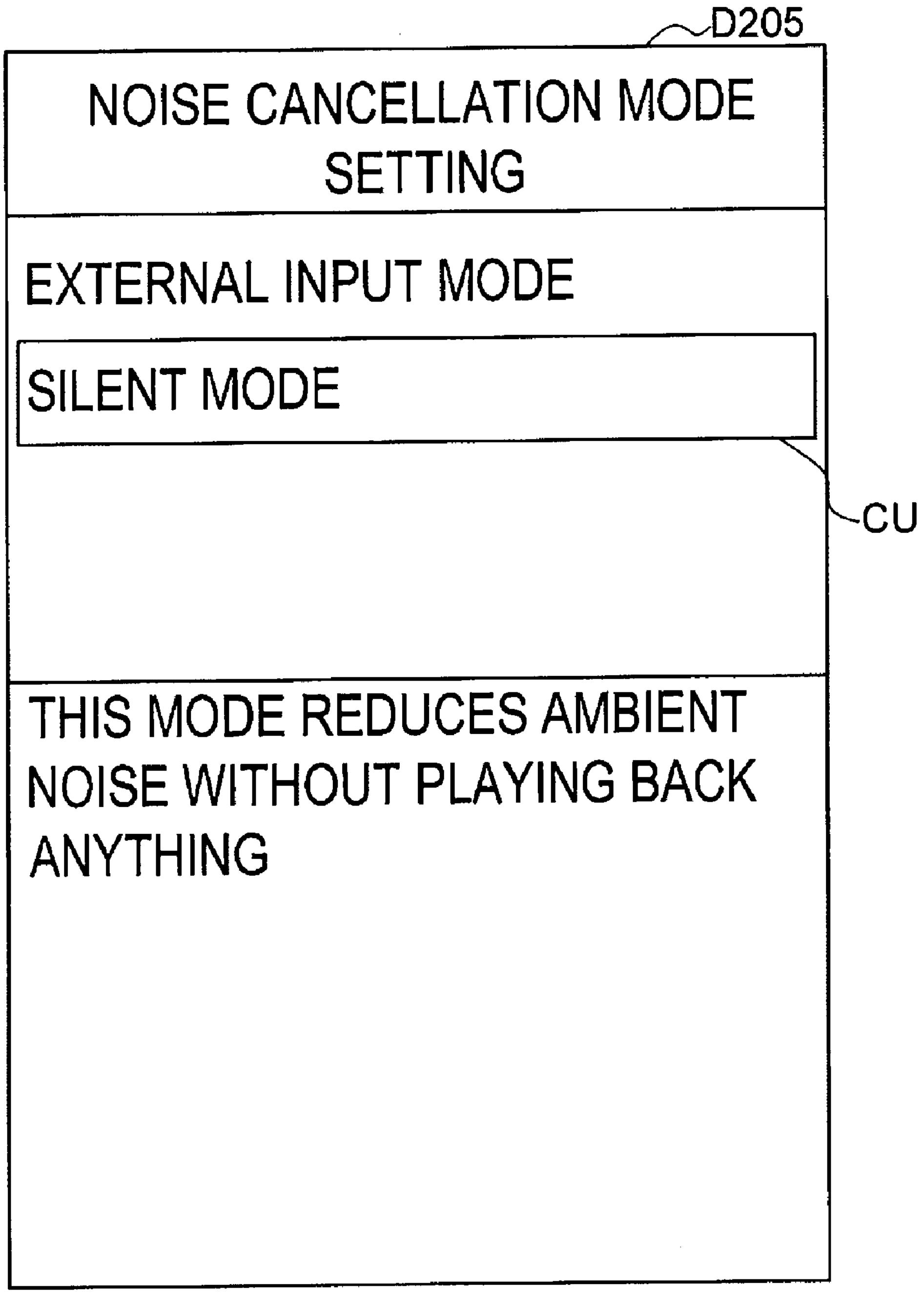
FIG. 16E is an explanatory figure that illustrates a display image displayed on the display portion by the operation of the playback device according to the second embodiment.
Figure 16F:
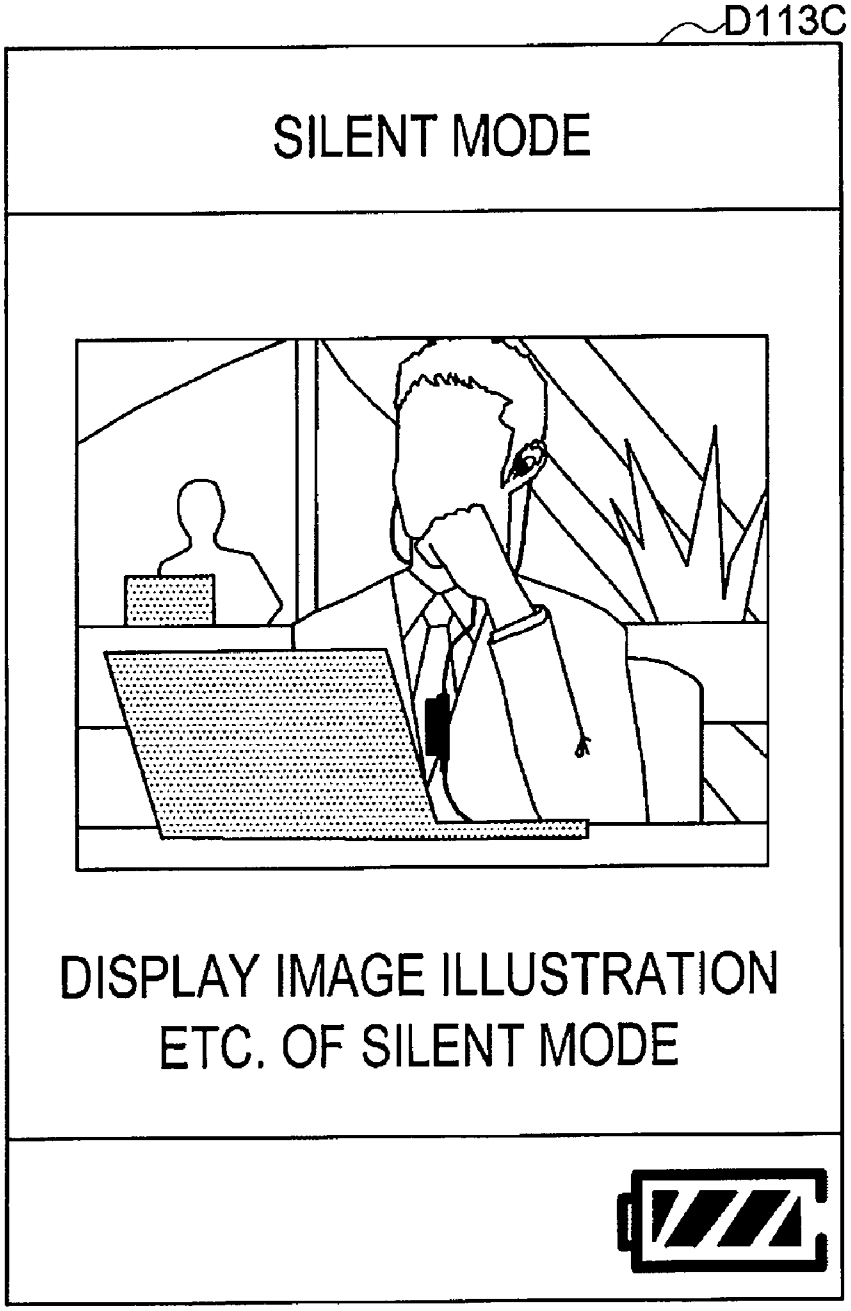
FIG. 16F is an explanatory figure that illustrates a display image displayed on the display portion by the operation of the playback device according to the second embodiment.

In a state where the image D205 is displayed, if the item "external input mode" is selected as shown in FIG. 16C, a mode selection signal indicating the external input mode is output from the operation portion 12 to the mode setting portion 113, and the mode setting portion 113 sets the mode to the external input mode. In the external input mode, the image D113B "external input mode" shown in FIG. 16D is displayed on the display portion 11. On the other hand, in the state where the image D205 is displayed, if the item "silent mode" is selected as shown in FIG. 16E, a mode selection signal indicating the silent mode is output from the operation portion 12 to the mode setting portion 113, and the mode setting portion 113 sets the mode to the silent mode. In the silent mode, the image D113C "silent mode" shown in FIG. 16F is displayed on the display portion 11.

If the user presses down, for example, a "back (return) button" provided on the operation portion 12, the operation portion 12 outputs a back signal, and the display control portion 111 changes the display on the display portion 11 from the image D113B "external input mode" or the image D113C "silent mode" to another image (for example, the image D205 "noise cancellation mode setting"). At the same time, the operation portion 12 outputs a mode selection signal indicating the normal mode to the mode setting portion 113. The mode setting portion 113 sets the mode to the normal mode. That is, the step S219 (mode switching) shown in FIG. 5 to FIG. 7 is performed by the user simply depressing the "back button". In other words, the mode is switched, from the state in which the image D113B "external input mode" or the image D113C "silent mode" is displayed, to the normal mode when another image is displayed. Moreover, in the present embodiment, when the power source of the playback device is turned OFF, the set mode is reset, and the normal mode is constantly set (provided that the NC switch is ON).

With the above configuration, in addition to the effects of the first embodiment, the user can return the mode to the normal mode by a simple operation only (depressing the back button), or by turning the power source OFF. Moreover, if the image D113B "external input mode" is displayed, the user can recognize that the mode is the external input mode. If the image D113C "silent mode" is displayed, the user can recognize that the mode is the silent mode. If another image is displayed, the user can recognize that the mode is the normal mode. Thus, the playback device 10 of the present embodiment provides easier operation, resulting in further improved operability.

Third Embodiment

Figure 17A:
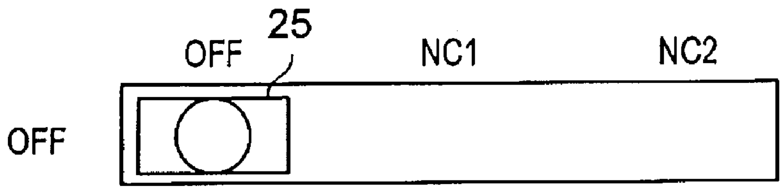
FIG. 17A is an explanatory figure that illustrates an NC switch provided on a playback device according to a third embodiment of the present invention.
Figure 17B:
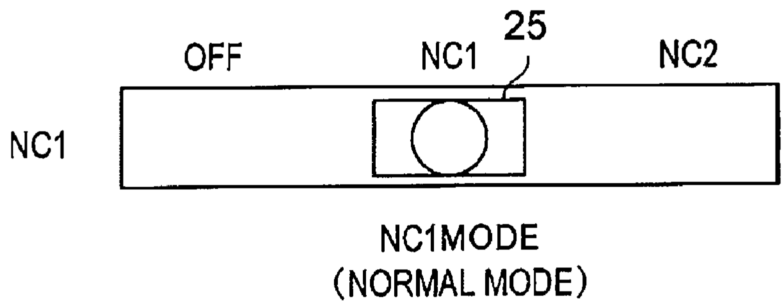
FIG. 17B is an explanatory figure that illustrates the NC switch provided on the playback device according to the third embodiment.
Figure 17C:
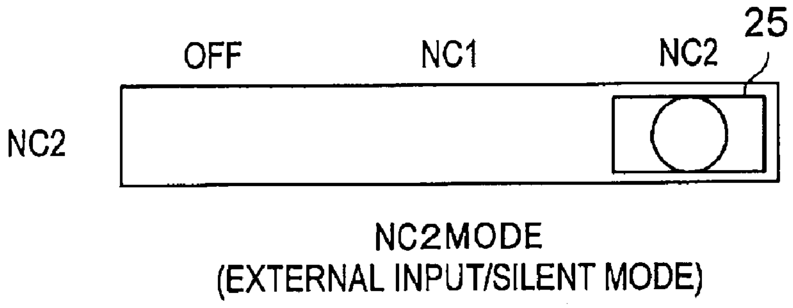
FIG. 17C is an explanatory figure that illustrates the NC switch provided on the playback device according to the third embodiment.

Next, a playback device according to a third embodiment of the present invention will be described with reference to FIG. 17A to FIG. 17C. FIG. 17A to FIG. 17C are explanatory figures that each illustrate an NC switch provided on the playback device according to the third embodiment of the present invention.

The playback device according to the present embodiment is configured basically in the same manner as the playback device according to the first and second embodiments. However, the playback device of the present embodiment is different from the playback device of the first and second embodiments in that the switching or setting of the normal mode, the external input mode and the silent mode is performed using a physical switch, without displaying the images shown in FIG. 9A to FIG. 9C, and FIG. 16C. Therefore, the playback device according to the present embodiment includes an NC switch 25 as shown in FIG. 17A to FIG. 17C, instead of the NC switch 15 provided on the playback device according to the first and second embodiments. The other structural elements of the playback device of the present embodiment are the same as those of the playback device of the first and second embodiments. Therefore, a detailed description thereof is omitted here.

The NC switch 25 has three positions, namely "OFF", "NC1" and "NC2". When the switch 25 is in the "OFF" position, as shown in FIG. 17A, the NC function is turned OFF, and step S103 and step S105 shown in FIG. 4 are performed. When the NC switch 25 is moved to the "NC 1" position as shown in FIG. 17B, the mode setting portion 113 sets the mode to the normal mode. When the NC switch is further moved to the "NC 2" position as shown in FIG. 17C, the mode setting portion 113 sets the mode to the external input mode or to the silent mode. The switching between the external input mode and the silent mode is automatically performed by the mode setting portion 113 when it is determined at step S107 shown in FIG. 4 whether or not the external device 40 is connected.

Note that, when the NC switch 25 is in the "NC2" position, even in a case where the power source of the playback device 10 has been turned OFF and the power source is next turned ON, a mode corresponding to "NC2", namely, the set external input mode or the set silent mode is maintained. Further, when the NC switch 25 is in the "NC2" position, the image D113B "external input mode" shown in FIG. 13 or the image D113C "silent mode" shown in FIG. 15 is displayed on the display portion 11. If the back button or the like is depressed, the display on the display portion 11 does not shift to, for example, the "home menu" screen D101 shown in FIG. 11A. In this case, when the back button is depressed, it is preferable that a message like "please slide the noise cancel switch to NC 1 or OFF" is displayed on the display portion 11 or output as a voice message. On the other hand, when the option button is depressed, it is possible to display the image D113BO "option menu" shown in FIG. 14. However, the item "NC mode switching" is not displayed in the image D113BO. Further, when the NC switch 25 is moved from the "NC2" position to the "NC1" or "OFF" position, it is preferable that, for example, the D113A1 screen displayed during playback shown in FIG. 10D, the "home menu" screen D101 shown in FIG. 10A, or the like is displayed.

With the above configuration, in addition to the effects of the first and second embodiments, the user can easily switch the NC mode even if the user is not accustomed to operating the playback device 10 while looking at the display screen. Thus, operability can be further improved.

Fourth Embodiment

Figure 18:
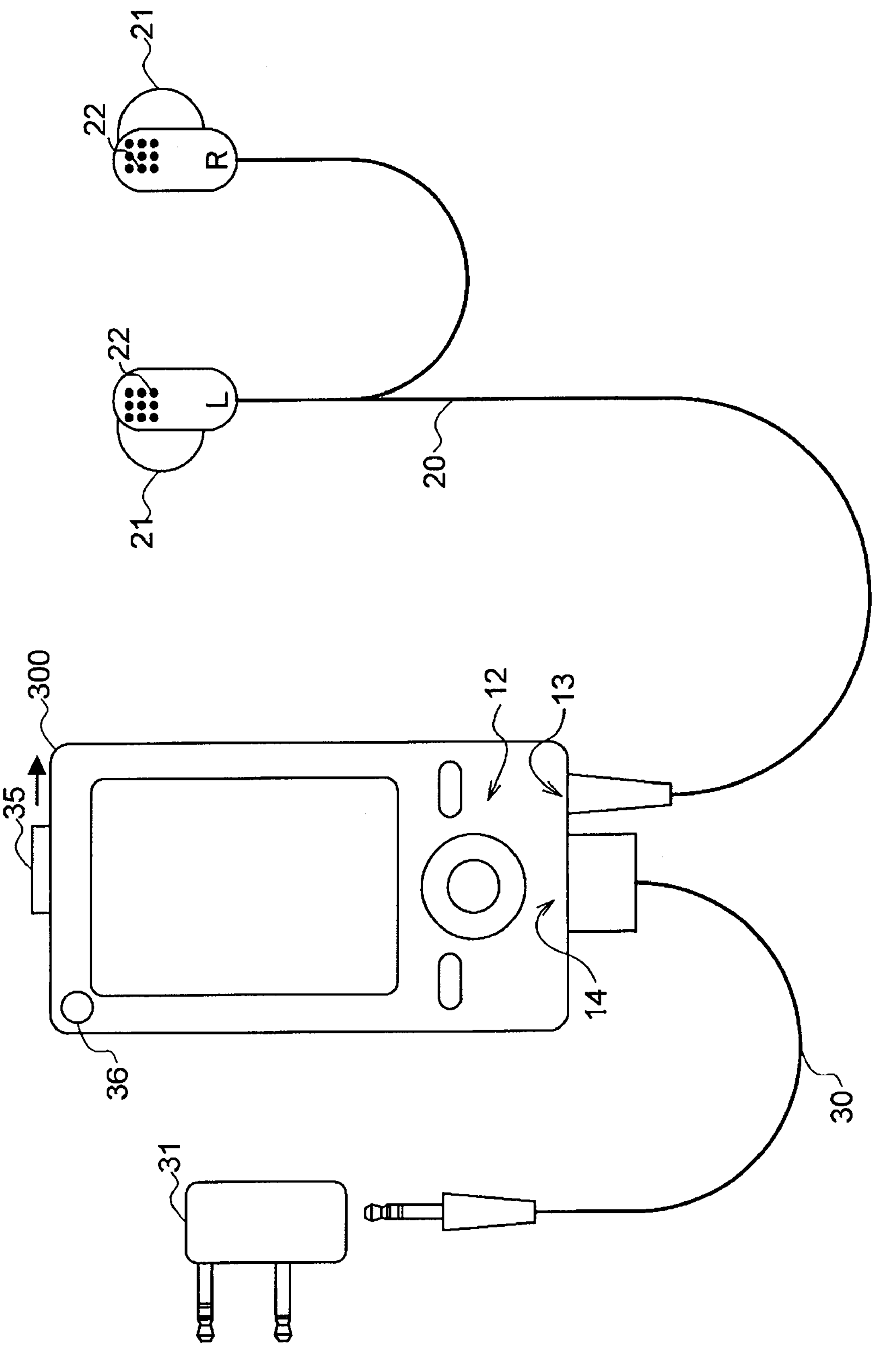
FIG. 18 is an explanatory figure that illustrates an external configuration and the like of a playback device according to a fourth embodiment of the present invention.
Figure 19A:
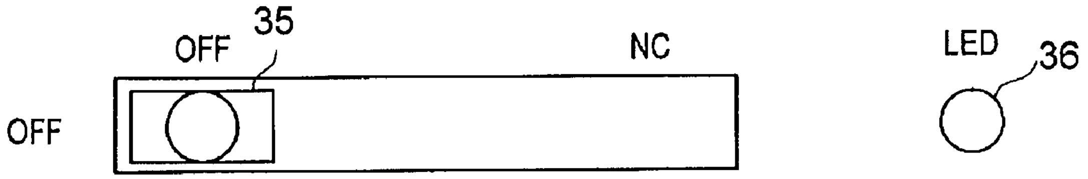
FIG. 19A is an explanatory figure that illustrates an NC switch provided on the playback device according to the fourth embodiment.
Figure 19B:
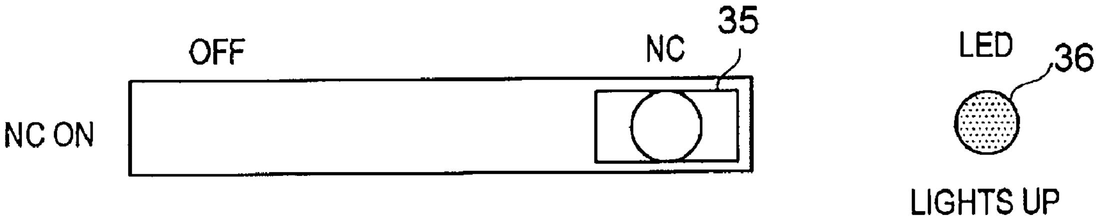
FIG. 19B is an explanatory figure that illustrates the NC switch provided on the playback device according to the fourth embodiment.

Next, a playback device according to a fourth embodiment of the present invention will be described with reference to FIG. 18, FIG. 19A and FIG. 19B. FIG. 18 is an explanatory figure that illustrates an external configuration and the like of the playback device according to the fourth embodiment of the present invention. FIG. 19A and FIG. 19B are explanatory figures that each illustrate an NC switch provided on the playback device according to the fourth embodiment of the present invention.

The playback device according to the present embodiment is configured basically in the same manner as the playback device according to the first or second embodiment. However, the playback device of the present embodiment is different from the playback device of the first or second embodiment in that a power source for the NC function is driven independently from a power source for other configuration functions. Therefore, as shown in FIG. 18, a playback device 300 according to the present embodiment includes: an NC switch 35, instead of the NC switch 15 provided on the playback device according to the first and second embodiments; and a light emitting diode (LED) light 36. The other structural elements of the playback device of the present embodiment are the same as those of the playback device of the first and second embodiments. Therefore, a detailed description thereof is omitted here.

Note that the NC switch 35 has two positions, namely "OFF" and "NC". When the switch 35 is in the "OFF" position as shown in FIG. 19A, the NC function is turned OFF. Therefore, if the main power source of the playback device 300 is turned OFF in this state, the playback device 300 is completely turned OFF. On the other hand, when the NC switch 35 has been moved to the "NC" position as shown in FIG. 19B, the structural elements that cause the NC function to operate are not turned OFF even if the main power source of the playback device 300 is turned OFF. Examples of the above structural elements include the NC signal generating portion 164, the signal synthesizing portion 165, the earphone connection portion 13 and the like. However, another structural elements may be included. Further, when the NC switch 35 is in the "NC" position and the NC function is ON, the LED light 36 is ON, as shown in FIG. 19B, thus informing the user of the ON state of the NC function. Note that the LED light 36 may be any physical display, for example, another light or the like. Furthermore, in the playback device 300 of the present embodiment, if playback or output in the normal mode or in the external input mode is completed in a state where the NC switch 35 is in the "NC" position, it is also possible to automatically switch the mode to the silent mode.

With the above configuration, in addition to the effects of the first and second embodiments, when the user wants to use only the NC function, there is no need to turn the power source of the playback device 300 ON. As a result, power consumption can be reduced.

It should be understood by those skilled in the art that various modifications, combinations, sub-combinations and alterations may occur depending on design requirements and other factors insofar as they are within the scope of the appended claims or the equivalents thereof.

In the above-described embodiments, for example, a case is described in which the NC signal generating portion 164 switches the filter that is used when generating an NC signal, in accordance with the mode. However, the present invention is not limited to the above example. For example, the same filter may be used in a plurality of modes, or the same filter may be used in all the modes.

Further, in the above-described embodiments, an audio output device, such as the earphone 20, and the playback device 10 are separately provided as shown in FIG. 1. However, the audio output device and the playback device 10 may form one playback system.

In the normal mode of the above-described embodiments, if the user depresses a pause button provided on the operation portion 12 (i.e., if a pause signal is output to the control portion 110) when the playback portion 162 is playing back content or a radio signal, the playback device 10 is brought into a standby state and the NC signal generating portion 164 is turned OFF. Further, it is also possible to turn OFF the power source of the playback device 10 if a certain time has elapsed in the standby state.

Figure 20:
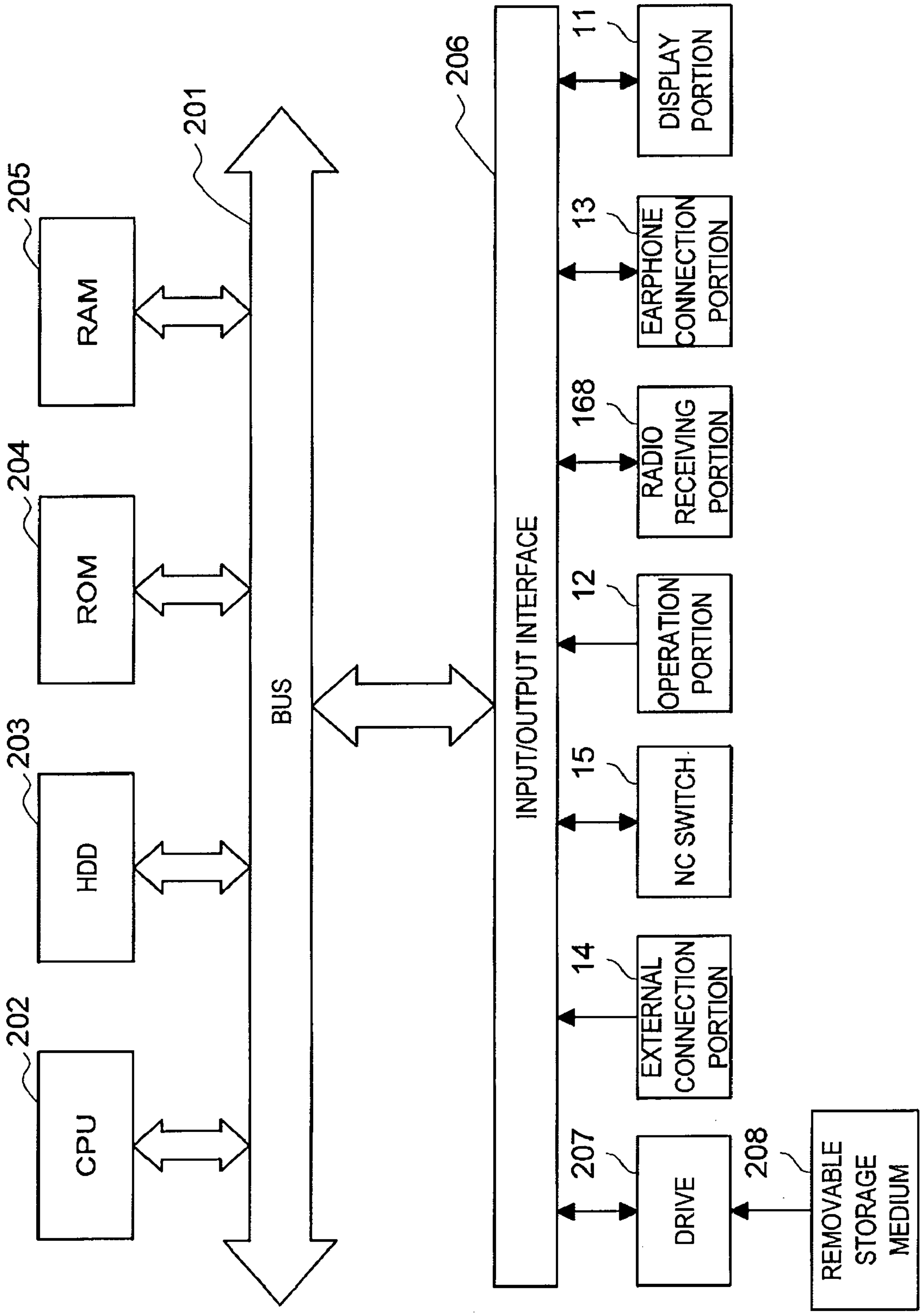
FIG. 20 is an explanatory figure that illustrates a configuration example of a playback device that realizes a series of processes.

The series of processes described in the above-described embodiments may be performed by a dedicated hardware. Alternatively, they may be performed by software. When the series of processes are performed by software, the playback device is configured as shown in FIG. 20. The above series of processes can also be realized by the structural elements shown in FIG. 20 executing a program.

FIG. 20 is an explanatory figure that illustrates a configuration example of a playback device that realizes a series of processes. A program to perform the series of processes is executed by a computer in the following manner.

As shown in FIG. 20, the playback device includes: a central processing unit (CPU) 202, and recording devices such as a hard disk drive (HDD) 203, a read only memory (ROM) 204, and a random access memory (RAM) 205, which are connected by, for example, a bus 201 and an input/output interface 206; an external connection portion 14 that is connected to the external device 40; a radio receiving portion 168 that receives a radio wave; an NC switch 15 and an operation portion 12 that output an operation signal and the like according to a user operation; an earphone connection portion 13 to which the earphone 20 is connected; and a display portion 11. Note that, when the playback device is a playback device that plays back content and the like recorded in advance in a recording portion as in the above-described embodiments, content is recorded in one of the aforementioned recording devices. On the other hand, when the playback device is a playback device (a player) that plays back audio information recorded in advance in a removable recording medium 208, this playback device may further include a drive 207 that reads and writes the removable recording medium 208 and the like, and content may be recorded in the removable recording medium 208.

The CPU 202 performs various processes according to a program recorded in the recording device or a program read out from the removable recording medium 208. Thus, the above-described series of processes are realized. At this time, the CPU 202 may perform various processes, if necessary, based on information or signals input from the NC switch 15 and the operation portion 12.

In this specification, the respective steps shown in FIG. 4 to FIG. 7 can, of course, be performed in a time series in the described order. However, these steps do not necessarily have to be performed in a time series, and may be performed in parallel or separately. Further, it is readily apparent that the order of the steps that are performed in a time series can be changed if necessary.

What is claimed is:

1. A playback device, comprising:

an acquisition portion that acquires an external audio signal;

a playback portion that plays back content and outputs at least an audio signal, the playback portion stopping playback of the content when the acquisition portion has acquired the external audio signal;

a generating portion that, based on noise collected by a sound collecting device, generates a noise cancellation signal to reduce the noise;

a switching portion that, if the acquisition portion has acquired the external audio signal when the playback portion is playing back content, switches an output signal from the audio signal to the external audio signal; and a synthesizing portion that synthesizes the output signal from the switching portion with the noise cancellation signal.

2. The playback device according to claim 1, wherein if the acquisition portion has acquired the external audio signal, the generating portion switches a property to generate the noise cancellation signal from one property to another property.

3. The playback device according to claim 1, wherein when the playback portion resumes playback from a stopped state, the playback portion resumes playback of the content from a stopped position.

4. The playback device according to claim 1, wherein when the playback portion has not yet played back the content and the acquisition portion has not acquired the external audio signal, the generating portion outputs the noise cancellation signal to the outside.

5. A playback portion that plays back content and outputs at least an audio signal;

an acquisition portion that acquires an external audio signal;

a generating portion that, based on noise collected by a sound collecting device, generates a noise cancellation signal to reduce the noise, the generating portion stopping generation of the noise cancellation signal when the noise includes predetermined information;

a switching portion that, if the acquisition portion has acquired the external audio signal when the playback portion is playing back content, switches an output signal from the audio signal to the external audio signal; and a synthesizing portion that synthesizes the output signal from the switching portion with the noise cancellation signal.

6. The playback device according to claim 1, wherein when the playback portion has stopped playback of the content, the generating portion stops generation of the noise cancellation signal.

7. A playback system, comprising:

an audio output device that includes a sound collecting device that collects ambient sound; and a playback device that includes a playback portion that plays back content and outputs at least an audio signal, an acquisition portion that acquires an external audio signal, a generating portion that generates a noise cancellation signal to reduce noise collected by the sound collecting device, the generating portion stopping generation of the noise cancellation signal when the noise includes predetermined information, a switching portion that, if the acquisition portion has acquired the external audio signal when the playback portion is playing back the content, switches an output signal from the audio signal to the external audio signal, and a synthesizing portion that synthesizes the output signal from the switching portion with the noise cancellation signal.

8. The playback device according to claim 1, the generating portion stops generation of the noise cancellation signal when the noise includes a siren of an emergency vehicle.

* * * * *